(12) United States Patent
Wang et al.

(10) Patent No.: US 9,325,523 B2
(45) Date of Patent: Apr. 26, 2016

(54) METHOD, DEVICE AND SYSTEM FOR ACCESSING WIRELESS LOCAL AREA NETWORK, WIRELESS STATION, AND WIRELESS ACCESS POINT

(71) Applicant: Huawei Technologies Co., Ltd., Shenzhen, Guangdong (CN)

(72) Inventors: Yungui Wang, Nanjing (CN); Yan Zhuang, Nanjing (CN); Donald Eggleston, Milford, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/306,031

(22) Filed: Jun. 16, 2014

(65) Prior Publication Data
US 2014/0293936 A1 Oct. 2, 2014

Related U.S. Application Data

(63) Continuation of application No. PCT/CN2012/086674, filed on Dec. 14, 2012.

(51) Int. Cl.
| | |
|---|---|
| *H04L 12/46* | (2006.01) |
| *H04W 80/00* | (2009.01) |
| *H04L 12/28* | (2006.01) |
| *H04W 84/12* | (2009.01) |

(52) U.S. Cl.
CPC ............ *H04L 12/4625* (2013.01); *H04W 80/00* (2013.01); *H04L 12/2834* (2013.01); *H04L 12/4633* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2006/0221987 | A1* | 10/2006 | Polson | H04L 12/462 370/402 |
| 2007/0189308 | A1* | 8/2007 | Tchigevsky | H04L 12/4625 370/396 |
| 2008/0037482 | A1 | 2/2008 | Douglas et al. | |
| 2008/0215754 | A1* | 9/2008 | Belimpasakis | H04L 12/462 709/245 |
| 2009/0190515 | A1 | 7/2009 | Finn et al. | |

(Continued)

FOREIGN PATENT DOCUMENTS

| | | |
|---|---|---|
| CN | 101080904 A | 11/2007 |
| CN | 101510853 A | 8/2009 |

(Continued)

OTHER PUBLICATIONS

Klein, "CSN & 802.11 BSS Bridging," IEEE 11-10/1231r0, Institute of Electrical and Electronics Engineers, New York, New York (Oct. 2012).

(Continued)

*Primary Examiner* — Min Jung
(74) *Attorney, Agent, or Firm* — Leydig, Voit & Mayer, Ltd.

(57) ABSTRACT

Embodiments of the present invention provide a method, a device and a system for accessing a wireless local area network, a wireless station, and a wireless access point. In the present invention, a wireless station bridge sets a virtual interface MAC address for an Ethernet device, so that the Ethernet device connected to the wireless station bridge has a corresponding MAC address in a wireless local area network, and therefore, the Ethernet device can access the wireless local area network by using a bridging function of the wireless station bridge.

18 Claims, 5 Drawing Sheets

(56) References Cited

U.S. PATENT DOCUMENTS

| | | | |
|---|---|---|---|
| 2010/0027516 A1* | 2/2010 | Nagarajan | H04L 12/4625 370/338 |
| 2010/0309894 A1* | 12/2010 | Csaszar | H04L 12/4641 370/338 |
| 2011/0149804 A1 | 6/2011 | Denteneer et al. | |
| 2011/0286380 A1* | 11/2011 | Zhu | H04W 88/02 370/315 |
| 2012/0051346 A1 | 3/2012 | Herbert et al. | |
| 2012/0314634 A1* | 12/2012 | Sekhar | H04L 47/40 370/311 |
| 2013/0094423 A1* | 4/2013 | Wengrovitz | H04L 12/1836 370/312 |
| 2013/0136117 A1* | 5/2013 | Schrum, Jr. | H04W 88/06 370/338 |
| 2013/0152075 A1* | 6/2013 | Cardona | G06F 9/45558 718/1 |
| 2014/0064184 A1 | 3/2014 | Cherian et al. | |
| 2014/0064196 A1 | 3/2014 | Abraham et al. | |

FOREIGN PATENT DOCUMENTS

| | | |
|---|---|---|
| CN | 101902399 A | 12/2010 |
| CN | 102316453 A | 1/2012 |
| EP | 2667682 A1 | 11/2013 |
| WO | WO 2007098063 A1 | 8/2007 |

OTHER PUBLICATIONS

"IEE Standard for Information technology—Telecommunications and information exchange between systems—Local and metropolitan area networks—Specific requirements, Part 11: Wireless LAN Medium Access Control (MAC) and Physical Layer (PHY) Specifications," IEEE Std. 802.11-2012, pp. i-2695, IEEE Computer Society, Institute of Electrical and Electronics Engineers, New York, New York (Mar. 29, 2012).

* cited by examiner

METHOD, DEVICE AND SYSTEM FOR ACCESSING WIRELESS LOCAL AREA NETWORK, WIRELESS STATION, AND WIRELESS ACCESS POINT

CROSS-REFERENCE TO RELATED APPLICATIONS

This application is a continuation of International Patent Application No. PCT/CN2012/086674, filed on Dec. 14, 2012, which is hereby incorporated by reference in its entirety.

TECHNICAL FIELD

This application relates to the field of communications technologies, and in particular, to a method, a device and a system for accessing a wireless local area network, a wireless station, and a wireless access point.

BACKGROUND

Generally, in a service set architecture of a wireless local area network (WLAN), a wireless station (STA) associated with a wireless access point (AP) sends data to the wireless AP, so as to communicate with another wireless STA. The wireless STA does not forward, through a wired connection, data sent by another device.

With the development of wireless communications technologies, a WLAN may connect to a wired network where a user is located. In this architecture, data is forwarded from the wired network where the user is located to a wireless network, and may be further forwarded to a wired network where another user is located or forwarded to a wide area network.

To fulfill a function of connecting a WLAN with a wired network where a user is located, the wireless STA also needs to be capable of forwarding data that is sent through a wired connection by another device. That is, in this architecture, the wireless STA also provides a bridging function.

SUMMARY

This application provides a method, an apparatus and a system for accessing a wireless local area network, a wireless station, and a wireless access point, to provide a bridging function for a wireless station.

In a first aspect, this application provides a method for accessing a wireless local area network, where the method includes:

receiving, by a first wireless station bridge, a first Ethernet data frame sent by a first Ethernet device, where a source media access control (MAC) address of the first Ethernet data frame is a MAC address of a first Ethernet device connected to the first wireless station bridge;

generating, by the first wireless station bridge, a first wireless local area network data frame according to the first Ethernet data frame, where a frame header of the first wireless local area network data frame includes a transmitter MAC address and a receiver MAC address, and the transmitter MAC address in the frame header of the first wireless local area network data frame is a virtual interface MAC address corresponding to the source MAC address of the first Ethernet data frame, and the virtual interface MAC address is one of a plurality of virtual interface MAC addresses of the first wireless station bridge; and sending, by the first wireless station bridge, the first wireless local area network data frame.

In a first implementation of the first aspect, after the receiving a first Ethernet data frame, the method further includes:

generating, by the first wireless station bridge, correspondence between the source MAC address of the first Ethernet data frame and the virtual interface MAC address corresponding to the source MAC address; and sending, by the first wireless station bridge, to a wireless access point, the correspondence between the source MAC address of the first Ethernet data frame and the virtual interface MAC address which is of the first wireless station bridge and corresponds to the source MAC address.

With reference to the first implementation of the first aspect, in a second implementation of the first aspect, the method further includes:

receiving, by the first wireless station bridge, correspondence which is between a virtual interface MAC address of a second wireless station bridge and a MAC address of an Ethernet device connected to the second wireless station bridge and is sent by the access point;

receiving, by the first wireless station bridge, a second wireless local area network data frame sent by the wireless access point, where a frame header of the second wireless local area network data frame includes a source MAC address, a transmitter MAC address and a receiver MAC address, the receiver MAC address in the frame header of the second wireless local area network data frame is the virtual interface MAC address of the first wireless station bridge, and the source MAC address in the frame header of the second wireless local area network data frame is the virtual interface MAC address of the second wireless station bridge; and generating, by the first wireless station bridge, a second Ethernet data frame according to the second wireless local area network data frame, where a destination MAC address of the second Ethernet data frame is a MAC address which is of an Ethernet device connected to the first wireless station bridge and corresponds to the receiver MAC address in the frame header of the second wireless local area network data frame according to the correspondence between the source MAC address of the first Ethernet data frame and the virtual interface MAC address corresponding to the source MAC address, and a source MAC address of the second Ethernet data frame is a MAC address which is of an Ethernet device connected to the second wireless station bridge and corresponds to the source MAC address in the frame header of the second wireless local area network data frame according to the correspondence between the virtual interface MAC address of the second wireless station bridge and the MAC address of the Ethernet device connected to the second wireless station bridge.

With reference to the first aspect and any one of the first implementation and the second implementation of the first aspect, in a third implementation of the first aspect, the method further includes:

receiving, by the first wireless station bridge, a third wireless local area network data frame sent by the wireless access point, where a frame header of the third wireless local area network data frame includes a source MAC address, a transmitter MAC address and a receiver MAC address; and in a case that the receiver MAC address in the frame header of the third wireless local area network data frame is a broadcast MAC address or a multicast MAC address and the source MAC address in the frame header of the third wireless local area network data frame is the virtual interface MAC address of the first wireless station bridge, discarding, by the first wireless station bridge, the third wireless local area network data frame.

With reference to the first aspect or the first implementation of the first aspect, in a fourth implementation of the first aspect, in a case that a destination MAC address of the first Ethernet data frame is a broadcast MAC address or a multicast MAC address and the first wireless local area network data frame carries an aggregate MAC service data unit (A-MSDU), the A-MSDU includes an A-MSDU subframe; and the A-MSDU subframe is generated according to the first Ethernet data frame, a source address of the A-MSDU subframe is the virtual interface MAC address corresponding to the source MAC address of the first Ethernet data frame, and a destination address of the A-MSDU subframe is the destination MAC address of the first Ethernet data frame.

With reference to the first aspect and any one of the first implementation and the fourth implementation of the first aspect, in a fifth implementation of the first aspect, the method further includes:

receiving, by the first wireless station bridge, a third wireless local area network data frame sent by the wireless access point, where the third wireless local area network data frame carries an A-MSDU, and a receiver MAC address in a frame header of the third wireless local area network data frame is a broadcast MAC address or a multicast MAC address;

obtaining, by the first wireless station bridge, an A-MSDU subframe in the A-MSDU carried by the third wireless local area network data frame; and in a case that a source address of the A-MSDU subframe is the virtual interface MAC address of the first wireless station bridge, discarding, by the first wireless station bridge, the A-MSDU subframe.

In a second aspect, this application provides a method for accessing a wireless local area network, where the method includes:

receiving, by a wireless access point, correspondence which is between a virtual interface MAC address of a first wireless station bridge and a MAC address of an Ethernet device connected to the first wireless station bridge and is from the first wireless station bridge;

receiving, by the wireless access point, a first wireless local area network data frame from a second wireless station bridge, where a frame header of the first wireless local area network data frame includes a transmitter MAC address and a receiver MAC address;

in a case that a destination device of the first wireless local area network data frame is a device connected to the wireless access point through the first wireless station bridge, generating, by the wireless access point, a second wireless local area network data frame according to the first wireless local area network data frame, where a frame header of the second wireless local area network data frame includes a transmitter MAC address and a receiver MAC address, and the receiver MAC address in the frame header of the second wireless local area network data frame is a virtual interface MAC address corresponding to a MAC address of the destination device of the first wireless local area network data frame according to the correspondence between the virtual interface MAC address of the first wireless station bridge and the MAC address of the Ethernet device connected to the first wireless station bridge; and sending, by the wireless access point, the second wireless local area network data frame.

In a first implementation of the second aspect, the first wireless local area network data frame carries a MAC service data unit (MSDU);

the frame header of the first wireless local area network data frame includes a destination MAC address, a transmitter MAC address and a receiver MAC address;

the MAC address of the destination device of the first wireless local area network data frame is the destination MAC address in the frame header of the first wireless local area network data frame;

the frame header of the second wireless local area network data frame includes a source MAC address, a transmitter MAC address and a receiver MAC address; and a source MAC address in the frame header of the second wireless local area network data frame is the transmitter MAC address in the frame header of the first wireless local area network data frame.

In a second implementation of the second aspect, the first wireless local area network data frame carries an A-MSDU;

the frame header of the first wireless local area network data frame includes a basic service set identification BSSID, a transmitter MAC address and a receiver MAC address;

the MAC address of the destination device of the first wireless local area network data frame is a destination MAC address of an A-MSDU subframe of the A-MSDU carried by the first wireless local area network data frame;

the frame header of the second wireless local area network data frame includes a source MAC address, a transmitter MAC address and a receiver MAC address;

a source MAC address in the frame header of the second wireless local area network data frame is the transmitter MAC address in the frame header of the first wireless local area network data frame; and the receiver MAC address in the frame header of the second wireless local area network data frame is a virtual interface MAC address corresponding to the destination address of the A-MSDU subframe according to the correspondence between the virtual interface MAC address of the first wireless station bridge and the MAC address of the Ethernet device connected to the first wireless station bridge.

In a third implementation of the second aspect, the first wireless local area network data frame carries an A-MSDU;

the frame header of the first wireless local area network data frame includes a basic service set identification BSSID, a transmitter MAC address and a receiver MAC address;

the MAC address of the destination device of the first wireless local area network data frame is a destination MAC address of an A-MSDU subframe of the A-MSDU carried by the first wireless local area network data frame;

the frame header of the second wireless local area network data frame includes the BSSID, a transmitter MAC address and a receiver MAC address; and the second wireless local area network data frame carries the A-MSDU.

With reference to the second aspect or the first implementation of the second aspect, in a fourth implementation of the second aspect, the method further includes:

receiving, by the wireless access point, a third wireless local area network data frame from the second wireless station bridge, where the third wireless local area network data frame carries a MSDU, and a frame header of the third wireless local area network data frame includes a destination MAC address, a transmitter MAC address and a receiver MAC address;

in a case that the destination MAC address in the frame header of the third wireless local area network data frame is a MAC address of a device connected to the wireless access point through an Ethernet, generating, by the wireless access point, a first Ethernet data frame according to the third wireless local area network data frame, where a source MAC address of the first Ethernet data frame is a MAC address corresponding to the transmitter MAC address in the frame header of the third wireless local area network data frame according to correspondence between a virtual interface MAC address of the second wireless station bridge and a MAC address of an Ethernet device connected to the second wireless station bridge, and a destination MAC address of the first Ethernet data frame is the destination MAC address in the frame header of the third wireless local area network data frame; and sending, by the wireless access point, the first Ethernet data frame.

With reference to the second aspect and any one of the first implementation and the fourth implementation of the second aspect, in a fifth implementation of the second aspect, the method further includes:

receiving, by the wireless access point, a second Ethernet data frame from a second Ethernet device;

in a case that a destination MAC address of the second Ethernet data frame is a MAC address of a device connected to the wireless access point through the first wireless station bridge, generating, by the wireless access point, a fourth wireless local area network data frame according to the second Ethernet data frame, where a frame header of the fourth wireless local area network data frame includes a source MAC address, a transmitter MAC address and a receiver MAC address, the source MAC address in the frame header of the fourth wireless local area network data frame is a source MAC address of the second Ethernet data frame, and the receiver MAC address in the frame header of the fourth wireless local area network data frame is a virtual interface MAC address corresponding to the destination MAC address of the second Ethernet data frame according to the correspondence between the virtual interface MAC address of the first wireless station bridge and the MAC address of the Ethernet device connected to the first wireless station bridge; and sending, by the wireless access point, the fourth wireless local area network data frame.

With reference to the second aspect and any one of the fourth implementation and the fifth implementation of the second aspect, in a sixth implementation of the second aspect, the first wireless local area network data frame carries a MSDU;

the frame header of the first wireless local area network data frame includes a destination MAC address, a transmitter MAC address and a receiver MAC address;

the MAC address of the destination device of the first wireless local area network data frame is the destination MAC address in the frame header of the first wireless local area network data frame;

the frame header of the second wireless local area network data frame includes a source MAC address, a transmitter MAC address and a receiver MAC address;

the source MAC address in the frame header of the second wireless local area network data frame is the transmitter MAC address in the frame header of the first wireless local area network data frame;

after the receiving, by a wireless access point, correspondence which is between a virtual interface MAC address of a first wireless station bridge and a MAC address of an Ethernet device connected to the first wireless station bridge and is from the first wireless station bridge, the method further includes:

receiving, by the wireless access point, the correspondence which is between the virtual interface MAC address of the second wireless station bridge and the MAC address of the Ethernet device connected to the second wireless station bridge and is from the second wireless station bridge, broadcasting, by the wireless access point, the correspondence between the virtual interface MAC address of the second wireless station bridge and the MAC address of the Ethernet device connected to the second wireless station bridge, and receiving, by the first wireless station bridge, the correspondence between the virtual interface MAC address of the second wireless station bridge and the MAC address of the Ethernet device connected to the second wireless station bridge; and after the sending, by the wireless access point, the second wireless local area network data frame, the method further includes:

receiving, by the first wireless station bridge, the second wireless local area network data frame, and generating, by the first wireless station bridge, a third Ethernet data frame according to the second wireless local area network data frame, where a destination MAC address of the third Ethernet data frame is a MAC address of an Ethernet device corresponding to the receiver MAC address in the frame header of the second wireless local area network data frame according to the correspondence between the virtual interface MAC address of the first wireless station bridge and the MAC address of the Ethernet device connected to the first wireless station bridge, and a source MAC address of the third Ethernet data frame is a MAC address which is of an Ethernet device connected to the second wireless station bridge and corresponds to the source MAC address in the frame header of the second wireless local area network data frame according to the correspondence between the virtual interface MAC address of the second wireless station bridge and the MAC address of the Ethernet device connected to the second wireless station bridge.

In a third aspect, this application provides an apparatus for accessing a wireless local area network, implemented by a first wireless station bridge, where the apparatus for accessing a wireless local area network includes a receiving module, a generating module and a sending module, where the receiving module is configured to receive a first Ethernet data frame sent by a first Ethernet device, where a source MAC address of the first Ethernet data frame is a MAC address of a first Ethernet device connected to the first wireless station bridge;

the generating module is configured to generate a first wireless local area network data frame according to the first Ethernet data frame, where a frame header of the first wireless local area network data frame includes a transmitter MAC address and a receiver MAC address, and the transmitter MAC address in the frame header of the first wireless local area network data frame is a virtual interface MAC address corresponding to the source MAC address of the first Ethernet data frame, and the virtual interface MAC address is one of a plurality of virtual interface MAC addresses generated by the generating module; and the sending module is configured to send the first wireless local area network data frame.

In a first implementation of the third aspect, the generating module is further configured to generate correspondence between the source MAC address of the first Ethernet data frame and the virtual interface MAC address corresponding to the source MAC address; and the sending module is further configured to send, to a wireless access point, the correspondence between the source MAC address of the first Ethernet data frame and the virtual interface MAC address which is generated by the generating module and corresponds to the source MAC address.

With reference to the first implementation of the third aspect, in a second implementation of the third aspect, the receiving module is further configured to receive correspondence which is between a virtual interface MAC address of a second wireless station bridge and a MAC address of an Ethernet device connected to the second wireless station bridge and is sent by the wireless access point;

the receiving module is further configured to receive a second wireless local area network data frame sent by the wireless access point, where a frame header of the second wireless local area network data frame includes a source MAC address, a transmitter MAC address and a receiver MAC address, the receiver MAC address in the frame header of the second wireless local area network data frame is the virtual interface MAC address generated by the generating module, and the source MAC address in the frame header of the second wireless local area network data frame is the virtual interface MAC address of the second wireless station bridge; and the generating module is configured to generate a second Ethernet data frame according to the second wireless local area network data frame, where a destination MAC address of the second Ethernet data frame is a MAC address which is of an Ethernet device connected to the first wireless station bridge and corresponds to the receiver MAC address in the frame header of the second wireless local area network data frame according to the correspondence between the source MAC address of the first Ethernet data frame and the virtual interface MAC address corresponding to the source MAC address, and a source MAC address of the second Ethernet data frame is a MAC address which is of an Ethernet device connected to the second wireless station bridge and corresponds to the source MAC address in the frame header of the second wireless local area network data frame according to the correspondence between the virtual interface MAC address of the second wireless station bridge and the MAC address of the Ethernet device connected to the second wireless station bridge.

With reference to the third aspect and any one of the first implementation and the second implementation of the third aspect, in a third implementation of the third aspect, the receiving module is further configured to receive a third wireless local area network data frame sent by the wireless access point, where a frame header of the third wireless local area network data frame includes a source MAC address, a transmitter MAC address and a receiver MAC address; and in a case that the receiver MAC address in the frame header of the third wireless local area network data frame is a broadcast MAC address or a multicast MAC address and the source MAC address in the frame header of the third wireless local area network data frame is the virtual interface MAC address generated by the generating module, the first wireless station bridge discards the third wireless local area network data frame.

With reference to the third aspect or the first implementation of the third aspect, in a fourth implementation of the third aspect, in a case that a destination MAC address of the first Ethernet data frame is a broadcast MAC address or a multicast MAC address and the first wireless local area network data frame carries an A-MSDU, the A-MSDU includes an A-MSDU subframe; and the A-MSDU subframe is generated by the generating module according to the first Ethernet data frame, a source address of the A-MSDU subframe is the virtual interface MAC address corresponding to the source MAC address of the first Ethernet data frame, and a destination address of the A-MSDU subframe is the destination MAC address of the first Ethernet data frame.

With reference to the third aspect and any one of the first implementation and the fourth implementation of the third aspect, in a fifth implementation of the third aspect, the receiving module is further configured to receive a third wireless local area network data frame sent by the wireless access point, where the third wireless local area network data frame carries an A-MSDU, a receiver MAC address in a frame header of the third wireless local area network data frame is a broadcast MAC address or a multicast MAC address;

the generating module is further configured to obtain an A-MSDU subframe in the A-MSDU carried by the third wireless local area network data frame; and in a case that a source address of the A-MSDU subframe is the virtual interface MAC address of the first wireless station bridge, the generating module discards the A-MSDU subframe.

In a fourth aspect, this application provides an apparatus for accessing a wireless local area network, implemented by a wireless access point, where the apparatus for accessing a wireless local area network includes a receiving module, a generating module and a sending module, where the receiving module is configured to receive correspondence which is between a virtual interface MAC address of a first wireless station bridge and a MAC address of an Ethernet device connected to the first wireless station bridge and is from the first wireless station bridge;

the receiving module is further configured to receive a first wireless local area network data frame from a second wireless station bridge, where a frame header of the first wireless local area network data frame includes a transmitter MAC address and a receiver MAC address;

the generating module is configured to, in a case that a destination device of the first wireless local area network data frame is a device connected to the wireless access point through the first wireless station bridge, generate a second wireless local area network data frame according to the first wireless local area network data frame, where a frame header of the second wireless local area network data frame includes a transmitter MAC address and a receiver MAC address, and the receiver MAC address in the frame header of the second wireless local area network data frame is a virtual interface MAC address corresponding to a MAC address of the destination device of the first wireless local area network data frame according to the correspondence between the virtual interface MAC address of the first wireless station bridge and the MAC address of the Ethernet device connected to the first wireless station bridge; and the sending module is configured to send the second wireless local area network data frame to the wireless access point.

In a first implementation of the fourth aspect, the first wireless local area network data frame carries a MSDU;

the frame header of the first wireless local area network data frame includes a destination MAC address, a transmitter MAC address and a receiver MAC address;

the MAC address of the destination device of the first wireless local area network data frame is the destination MAC address in the frame header of the first wireless local area network data frame;

the frame header of the second wireless local area network data frame includes a source MAC address, a transmitter MAC address and a receiver MAC address;

the source MAC address in the frame header of the second wireless local area network data frame is the transmitter MAC address in the frame header of the first wireless local area network data frame.

In a second implementation of the fourth aspect, the first wireless local area network data frame carries an A-MSDU;

the frame header of the first wireless local area network data frame includes a basic service set identification BSSID, a transmitter MAC address and a receiver MAC address;

the MAC address of the destination device of the first wireless local area network data frame is a destination MAC address of an A-MSDU subframe of the A-MSDU carried by the first wireless local area network data frame;

the frame header of the second wireless local area network data frame includes a source MAC address, a transmitter MAC address and a receiver MAC address;

the source MAC address in the frame header of the second wireless local area network data frame is the transmitter MAC address in the frame header of the first wireless local area network data frame; and the receiver MAC address in the frame header of the second wireless local area network data frame is a virtual interface MAC address corresponding to a destination address of the A-MSDU subframe according to the correspondence between the virtual interface MAC address of the first wireless station bridge and the MAC address of the Ethernet device connected to the first wireless station bridge.

In a third implementation of the fourth aspect, the first wireless local area network data frame carries an A-MSDU;

the frame header of the first wireless local area network data frame includes a basic service set identification BSSID, a transmitter MAC address and a receiver MAC address;

the MAC address of the destination device of the first wireless local area network data frame is a destination MAC address of an A-MSDU subframe of the A-MSDU carried by the first wireless local area network data frame;

the frame header of the second wireless local area network data frame includes the BSSID, a transmitter MAC address and a receiver MAC address; and the second wireless local area network data frame carries the A-MSDU.

With reference to the fourth aspect or the first implementation of the fourth aspect, in a fourth implementation of the fourth aspect, the receiving module is further configured to receive a third wireless local area network data frame from the second wireless station bridge, where the third wireless local area network data frame carries a MSDU, and a frame header of the third wireless local area network data frame includes a destination MAC address, a transmitter MAC address and a receiver MAC address;

the generating module is further configured to, in a case that the destination MAC address in the frame header of the third wireless local area network data frame is a MAC address of a device connected to the wireless access point through an Ethernet, generate a first Ethernet data frame according to the third wireless local area network data frame, where a source MAC address of the first Ethernet data frame is a MAC address corresponding to the transmitter MAC address in the frame header of the third wireless local area network data frame according to correspondence between a virtual interface MAC address of the second wireless station bridge and a MAC address of an Ethernet device connected to the second wireless station bridge, and a destination MAC address of the first Ethernet data frame is the destination MAC address in the frame header of the third wireless local area network data frame; and the sending module is further configured to send the first Ethernet data frame.

With reference to the fourth aspect and any one of the first implementation and the fourth implementation of the fourth aspect, in a fifth implementation of the fourth aspect, the receiving module is further configured to receive a second Ethernet data frame from a second Ethernet device;

the generating module is further configured to, in a case that a destination MAC address of the second Ethernet data frame is a MAC address of a device connected to the wireless access point through the first wireless station bridge, generate a fourth wireless local area network data frame according to the second Ethernet data frame, where a frame header of the fourth wireless local area network data frame includes a source MAC address, a transmitter MAC address and a receiver MAC address, the source MAC address in the frame header of the fourth wireless local area network data frame is a source MAC address of the second Ethernet data frame, and the receiver MAC address in the frame header of the fourth wireless local area network data frame is a virtual interface MAC address corresponding to the destination MAC address of the second Ethernet data frame according to the correspondence between the virtual interface MAC address of the first wireless station bridge and the MAC address of the Ethernet device connected to the first wireless station bridge; and the sending module is further configured to send the fourth wireless local area network data frame.

In a fifth aspect, this application provides a wireless station, including an Ethernet adapter, a wireless local area network adapter, a processor and a memory, where the Ethernet adapter is connected to the processor, the wireless local area network adapter is connected to the processor, and the memory is connected to the processor;

the Ethernet adapter receives a first Ethernet data frame sent by a first Ethernet device, where a source MAC address of the first Ethernet data frame is a MAC address of a first Ethernet device connected to the wireless station;

the processor generates a first wireless local area network data frame according to the first Ethernet data frame, where a frame header of the first wireless local area network data frame includes a transmitter MAC address and a receiver MAC address, and the transmitter MAC address in the frame header of the first wireless local area network data frame is a virtual interface MAC address corresponding to the source MAC address of the first Ethernet data frame, and the virtual interface MAC address is one of a plurality of virtual interface MAC addresses of the wireless station; and the wireless local area network adapter sends the first wireless local area network data frame.

In a first implementation of the fifth aspect, after receiving the first Ethernet data frame, the processor generates correspondence between the source MAC address of the first Ethernet data frame and the virtual interface MAC address corresponding to the source MAC address; and the wireless local area network adapter sends, to a wireless access point, the correspondence between the source MAC address of the first Ethernet data frame and the virtual interface MAC address which is of the wireless station and corresponds to the source MAC address.

With reference to the first implementation of the fifth aspect, in a second implementation of the fifth aspect, further including:

the wireless local area network adapter receives correspondence which is between a virtual interface MAC address of a second wireless station bridge and a MAC address of an Ethernet device connected to the second wireless station bridge and is sent by the wireless access point;

the wireless local area network adapter receives a second wireless local area network data frame sent by the wireless access point, where a frame header of the second wireless local area network data frame includes a source MAC address, a transmitter MAC address and a receiver MAC address, the receiver MAC address in the frame header of the second wireless local area network data frame is the virtual interface MAC address of the wireless station, and the source MAC address in the frame header of the second wireless local area network data frame is the virtual interface MAC address of the second wireless station bridge; and the processor generates a second Ethernet data frame according to the second wireless local area network data frame, where a destination MAC address of the second Ethernet data frame is a MAC address which is of an Ethernet device connected to the wireless station and corresponds to the receiver MAC address in the frame header of the second wireless local area network data frame according to the correspondence between the source MAC address of the first Ethernet data frame and the virtual interface MAC address corresponding to the source MAC address, and a source MAC address of the second Ethernet data frame is a MAC address which is of an Ethernet device connected to the second wireless station bridge and corresponds to the source MAC address in the frame header of the second wireless local area network data frame according to the correspondence between the virtual interface MAC address of the second wireless station bridge and the MAC address of the Ethernet device connected to the second wireless station bridge.

With reference to the fifth aspect and any one of the first implementation and the second implementation of the fifth aspect, in a third implementation of the fifth aspect, further including:

the wireless local area network adapter receives a third wireless local area network data frame sent by the wireless access point, where a frame header of the third wireless local area network data frame includes a source MAC address, a transmitter MAC address and a receiver MAC address; and in a case that the receiver MAC address in the frame header of the third wireless local area network data frame is a broadcast MAC address or a multicast MAC address and the source MAC address in the frame header of the third wireless local area network data frame is the virtual interface MAC address of the wireless station, the processor discards the third wireless local area network data frame.

With reference to the fifth aspect or the first implementation of the fifth aspect, in a fourth implementation of the fifth aspect, in a case that a destination MAC address of the first Ethernet data frame is a broadcast MAC address or a multicast MAC address and the first wireless local area network data frame carries an A-MSDU, the A-MSDU includes an A-MSDU subframe; and the A-MSDU subframe is generated by the processor according to the first Ethernet data frame, a source address of the A-MSDU subframe is the virtual interface MAC address corresponding to the source MAC address of the first Ethernet data frame, and a destination address of the A-MSDU subframe is the destination MAC address of the first Ethernet data frame.

With reference to the fifth aspect and any one of the first implementation and the fourth implementation of the fifth aspect, in a fifth implementation of the fifth aspect, further including:

the wireless local area network adapter receives a third wireless local area network data frame sent by the wireless access point, where the third wireless local area network data frame carries an A-MSDU, and a receiver MAC address in a frame header of the third wireless local area network data frame is a broadcast MAC address or a multicast MAC address;

the processor obtains an A-MSDU subframe in the A-MSDU carried by the third wireless local area network data frame; and in a case that a source address of the A-MSDU subframe is the virtual interface MAC address of the wireless station, the processor discards the A-MSDU subframe.

In a sixth aspect, this application provides a wireless access point, including a baseband processor, a processor and a memory, where the baseband processor is connected to the processor, and the memory is connected to the processor;

the processor receives, through the baseband processor, correspondence which is between a virtual interface MAC address of a first wireless station bridge and a MAC address of an Ethernet device connected to the first wireless station bridge and is from the first wireless station bridge;

the processor receives a first wireless local area network data frame from a second wireless station bridge through the baseband processor, where a frame header of the first wireless local area network data frame includes a transmitter MAC address and a receiver MAC address;

in a case that a destination device of the first wireless local area network data frame is a device connected to the wireless access point through the first wireless station bridge, the processor generates a second wireless local area network data frame according to the first wireless local area network data frame, where a frame header of the second wireless local area network data frame includes a transmitter MAC address and a receiver MAC address, and the receiver MAC address in the frame header of the second wireless local area network data frame is a virtual interface MAC address corresponding to a MAC address of the destination device of the first wireless local area network data frame according to the correspondence between the virtual interface MAC address of the first wireless station bridge and the MAC address of the Ethernet device connected to the first wireless station bridge; and the processor sends the second wireless local area network data frame through the baseband processor.

In a first implementation of the sixth aspect, the first wireless local area network data frame carries a MSDU;

the frame header of the first wireless local area network data frame includes a destination MAC address, a transmitter MAC address and a receiver MAC address;

the MAC address of the destination device of the first wireless local area network data frame is the destination MAC address in the frame header of the first wireless local area network data frame;

the frame header of the second wireless local area network data frame includes a source MAC address, a transmitter MAC address and a receiver MAC address; and the source MAC address in the frame header of the second wireless local area network data frame is the transmitter MAC address in the frame header of the first wireless local area network data frame.

In a second implementation of the sixth aspect, the first wireless local area network data frame carries an A-MSDU;

the frame header of the first wireless local area network data frame includes a basic service set identification BSSID, a transmitter MAC address and a receiver MAC address;

the MAC address of the destination device of the first wireless local area network data frame is a destination MAC address of an A-MSDU subframe of the A-MSDU carried by the first wireless local area network data frame;

the frame header of the second wireless local area network data frame includes a source MAC address, a transmitter MAC address and a receiver MAC address;

the source MAC address in the frame header of the second wireless local area network data frame is the transmitter MAC address in the frame header of the first wireless local area network data frame; and the receiver MAC address in the frame header of the second wireless local area network data frame is a virtual interface MAC address corresponding to a destination address of the A-MSDU subframe according to the correspondence between the virtual interface MAC address of the first wireless station bridge and the MAC address of the Ethernet device connected to the first wireless station bridge.

In a third implementation of the sixth aspect, the first wireless local area network data frame carries an A-MSDU;

the frame header of the first wireless local area network data frame includes a basic service set identification BSSID, a transmitter MAC address and a receiver MAC address;

the MAC address of the destination device of the first wireless local area network data frame is a destination MAC address of an A-MSDU subframe of the A-MSDU carried by the first wireless local area network data frame;

the frame header of the second wireless local area network data frame includes the BSSID, a transmitter MAC address and a receiver MAC address; and the second wireless local area network data frame carries the A-MSDU.

With reference to the sixth aspect or the first implementation of the sixth aspect, in a fourth implementation of the sixth aspect, further including:

the processor receives a third wireless local area network data frame from the second wireless station bridge through the baseband processor, where the third wireless local area network data frame carries a MSDU, and a frame header of the third wireless local area network data frame includes a destination MAC address, a transmitter MAC address and a receiver MAC address;

in a case that the destination MAC address in the frame header of the third wireless local area network data frame is a MAC address of a device connected to the wireless access point through an Ethernet, the processor generates a first Ethernet data frame according to the third wireless local area network data frame, where a source MAC address of the first Ethernet data frame is a MAC address corresponding to the transmitter MAC address in the frame header of the third wireless local area network data frame according to correspondence between a virtual interface MAC address of the second wireless station bridge and a MAC address of an Ethernet device connected to the second wireless station bridge, and a destination MAC address of the first Ethernet data frame is the destination MAC address in the frame header of the third wireless local area network data frame; and the processor sends the first Ethernet data frame through the baseband processor.

With reference to the sixth aspect and any one of the first implementation and the fourth implementation of the sixth aspect, in a fifth implementation of the sixth aspect, further including:

the processor receives a second Ethernet data frame from a second Ethernet device through the baseband processor;

in a case that a destination MAC address of the second Ethernet data frame is a MAC address of a device connected to the wireless access point through the first wireless station bridge, the processor generates a fourth wireless local area network data frame according to the second Ethernet data frame, where a frame header of the fourth wireless local area network data frame includes a source MAC address, a transmitter MAC address and a receiver MAC address, the source MAC address in the frame header of the fourth wireless local area network data frame is a source MAC address of the second Ethernet data frame, and the receiver MAC address in the frame header of the fourth wireless local area network data frame is a virtual interface MAC address corresponding to the destination MAC address of the second Ethernet data frame according to the correspondence between the virtual interface MAC address of the first wireless station bridge and the MAC address of the Ethernet device connected to the first wireless station bridge; and the processor sends the fourth wireless local area network data frame through the baseband processor.

In a seventh aspect, this application provides a wireless local area network system, including a first wireless station bridge, a second wireless station bridge and a wireless access point, where the first wireless station bridge receives a first Ethernet data frame sent by a first Ethernet device, where a source MAC address of the first Ethernet data frame is a MAC address of a first Ethernet device connected to the first wireless station bridge; the first wireless station bridge generates a first wireless local area network data frame according to the first Ethernet data frame, where a frame header of the first wireless local area network data frame includes a transmitter MAC address and a receiver MAC address, and the transmitter MAC address in the frame header of the first wireless local area network data frame is a virtual interface MAC address corresponding to the source MAC address of the first Ethernet data frame, and the virtual interface MAC address is one of a plurality of virtual interface MAC addresses of the first wireless station bridge; the first wireless station bridge sends the first wireless local area network data frame; the first wireless station bridge generates correspondence between the source MAC address of the first Ethernet data frame and the virtual interface MAC address corresponding to the source MAC address; and the first wireless station bridge sends, to the wireless access point, the correspondence between the source MAC address of the first Ethernet data frame and the virtual interface MAC address which is of the first wireless station bridge and corresponds to the source MAC address;

the wireless access point receives the correspondence between the source MAC address of the first Ethernet data frame and the virtual interface MAC address which is of the first wireless station bridge and corresponds to the source MAC address; the wireless access point broadcasts the correspondence between the source MAC address of the first Ethernet data frame and the virtual interface MAC address which is of the first wireless station bridge and corresponds to the source MAC address; the wireless access point receives correspondence which is between a virtual interface MAC address of the second wireless station bridge and a MAC address of an Ethernet device connected to the second wireless station bridge and is from the second wireless station bridge; the wireless access point receives the first wireless local area network data frame from a first wireless station bridge; in a case that a destination device of the first wireless local area network data frame is a device connected to the wireless access point through the second wireless station bridge, the wireless access point generates a second wireless local area network data frame according to the first wireless local area network data frame, where a frame header of the second wireless local area network data frame includes a transmitter MAC address and a receiver MAC address, and the receiver MAC address in the frame header of the second wireless local area network data frame is a virtual interface MAC address corresponding to a MAC address of the destination device of the first wireless local area network data frame according to the correspondence between the virtual interface MAC address of the second wireless station bridge and the MAC address of the Ethernet device connected to the second wireless station bridge; and the wireless access point sends the second wireless local area network data frame; and the second wireless station bridge receives the correspondence between the source MAC address of the first Ethernet data frame and the virtual interface MAC address which is of the first wireless station bridge and corresponds to the source MAC address; the second wireless station bridge receives the second wireless local area network data frame sent by the wireless access point; and the second wireless station bridge generates a second Ethernet data frame according to the second wireless local area network data frame.

In a first implementation of the seventh aspect, the wireless local area network system further includes a second Ethernet device, where the second Ethernet device is connected to the wireless access point;

the wireless access point receives a second Ethernet data frame from the second Ethernet device;

in a case that a destination MAC address of the second Ethernet data frame is a MAC address of a device connected to the first wireless station bridge, the wireless access point generates a fourth wireless local area network data frame according to the second Ethernet data frame, where a frame header of the fourth wireless local area network data frame includes a source MAC address, a transmitter MAC address and a receiver MAC address, the source MAC address in the frame header of the fourth wireless local area network data frame is a source MAC address of the second Ethernet data frame, and the receiver MAC address in the frame header of the fourth wireless local area network data frame is a virtual interface MAC address corresponding to the destination MAC address of the second Ethernet data frame according to the correspondence between the virtual interface MAC address of the first wireless station bridge and the MAC address of the Ethernet device connected to the first wireless station bridge; and the wireless access point sends the fourth wireless local area network data frame.

In an eighth aspect, this application provides a method for accessing a wireless local area network, where the method includes:

receiving, by a first wireless station bridge, a first Ethernet data frame sent by a first Ethernet device, where a source MAC address of the first Ethernet data frame is a MAC address of a first Ethernet device connected to the first wireless station bridge;

generating, by the first wireless station bridge, a first wireless local area network data frame according to the first Ethernet data frame, where a frame header of the first wireless local area network data frame includes a transmitter MAC address, a receiver MAC address and a basic service set identification BSSID, the transmitter MAC address in the frame header of the first wireless local area network data frame is the source MAC address of the first Ethernet data frame, and the receiver MAC address in the frame header of the first wireless local area network data frame is a MAC address of a wireless access point, the first wireless local area network data frame carries an A-MSDU, the A-MSDU includes an A-MSDU subframe, the A-MSDU subframe is generated according to the first Ethernet data frame, a source address of the A-MSDU subframe is the virtual interface MAC address corresponding to the source MAC address of the first Ethernet data frame, the virtual interface MAC address is one of a plurality of virtual interface MAC addresses of the first wireless station bridge, and a destination address of the A-MSDU subframe is a destination MAC address of the first Ethernet data frame; and sending, by the first wireless station bridge, the first wireless local area network data frame.

In a first implementation of the eighth aspect, the destination MAC address of the first Ethernet data frame is a broadcast MAC address or a multicast MAC address.

With reference to the eighth aspect or the first implementation of the eighth aspect, in a second implementation of the eighth aspect, after the receiving a first Ethernet data frame, the method further includes:

generating, by the first wireless station bridge, correspondence between the source MAC address of the first Ethernet data frame and the virtual interface MAC address corresponding to the source MAC address; and sending, by the first wireless station bridge, to the wireless access point, the correspondence between the source MAC address of the first Ethernet data frame and the virtual interface MAC address which is of the first wireless station bridge and corresponds to the source MAC address.

With reference to the eighth aspect and any one of the first implementation and the second implementation of the eighth aspect, in a third implementation of the eighth aspect, the method further includes:

receiving, by the first wireless station bridge, a third wireless local area network data frame sent by the wireless access point, where the third wireless local area network data frame carries an A-MSDU;

obtaining, by the first wireless station bridge, an A-MSDU subframe in the A-MSDU carried by the third wireless local area network data frame;

generating, by the first wireless station bridge, a second Ethernet data frame according to the A-MSDU subframe, where a destination MAC address of the second Ethernet data frame is a destination address of the A-MSDU subframe, and a source MAC address of the second Ethernet data frame is a MAC address corresponding to a source MAC address of the A-MSDU subframe according to correspondence broadcast by the wireless access point; and sending the second Ethernet data frame.

With reference to the eighth aspect and any one of the first implementation and the second implementation of the eighth aspect, in a fourth implementation of the eighth aspect, the method further includes:

receiving, by the first wireless station bridge, a third wireless local area network data frame sent by the wireless access point, where the third wireless local area network data frame carries an A-MSDU, and a receiver MAC address in a frame header of the third wireless local area network data frame is a broadcast MAC address or a multicast MAC address;

obtaining, by the first wireless station bridge, an A-MSDU subframe in the A-MSDU carried by the third wireless local area network data frame; and in a case that a source address of the A-MSDU subframe is the virtual interface MAC address of the first wireless station bridge, discarding, by the first wireless station bridge, the A-MSDU subframe.

In a ninth aspect, this application provides an apparatus for accessing a wireless local area network, implemented by a first wireless station bridge, where the apparatus for accessing a wireless local area network includes a receiving module, a generating module and a sending module, where the receiving module is configured to receive a first Ethernet data frame sent by a first Ethernet device, where a source MAC address of the first Ethernet data frame is a MAC address of a first Ethernet device connected to the first wireless station bridge;

the generating module is configured to generate a first wireless local area network data frame according to the first Ethernet data frame, where a frame header of the first wireless local area network data frame includes a transmitter MAC address, a receiver MAC address and a basic service set identification BSSID, the transmitter MAC address in the frame header of the first wireless local area network data frame is the source MAC address of the first Ethernet data frame, and the receiver MAC address in the frame header of the first wireless local area network data frame is a MAC address of a wireless access point, the first wireless local area network data frame carries an A-MSDU, the A-MSDU includes an A-MSDU subframe, the A-MSDU subframe is generated according to the first Ethernet data frame, a source address of the A-MSDU subframe is the virtual interface MAC address corresponding to the source MAC address of the first Ethernet data frame, the virtual interface MAC address is one of a plurality of virtual interface MAC addresses of the first wireless station bridge, and a destination address of the A-MSDU subframe is a destination MAC address of the first Ethernet data frame; and the sending module is configured to send the first wireless local area network data frame.

In a first implementation of the ninth aspect, the destination MAC address of the first Ethernet data frame is a broadcast MAC address or a multicast MAC address.

With reference to the ninth aspect or the first implementation of the ninth aspect, in a second implementation of the ninth aspect, the generating module is further configured to generate correspondence between the source MAC address of the first Ethernet data frame and the virtual interface MAC address corresponding to the source MAC address; and the sending module is further configured to send, to the wireless access point, the correspondence between the source MAC address of the first Ethernet data frame and the virtual interface MAC address which is of the first wireless station bridge and corresponds to the source MAC address.

With reference to the ninth aspect and any one of the first implementation and the second implementation of the ninth aspect, in a third implementation of the ninth aspect, the receiving module is further configured to receive a third wireless local area network data frame sent by the wireless access point, where the third wireless local area network data frame carries an A-MSDU;

the generating module is further configured to obtain an A-MSDU subframe in the A-MSDU carried by the third wireless local area network data frame, and generate a second Ethernet data frame according to the A-MSDU subframe, where a destination MAC address of the second Ethernet data frame is a destination address of the A-MSDU subframe, and a source MAC address of the second Ethernet data frame is a MAC address corresponding to a source MAC address of the A-MSDU subframe according to correspondence broadcast by the wireless access point; and the sending module is further configured to send the second Ethernet data frame.

With reference to the ninth aspect and any one of the first implementation and the second implementation of the ninth aspect, in a fourth implementation of the ninth aspect, the receiving module is further configured to receive a third wireless local area network data frame sent by the wireless access point, where the third wireless local area network data frame carries an A-MSDU, and a receiver MAC address in a frame header of the third wireless local area network data frame is a broadcast MAC address or a multicast MAC address; and the receiving module is further configured to obtain an A-MSDU subframe in the A-MSDU carried by the third wireless local area network data frame, and in a case that a source address of the A-MSDU subframe is the virtual interface MAC address of the first wireless station bridge, discard the A-MSDU subframe.

In a tenth aspect, this application provides a wireless station, including an Ethernet adapter, a wireless local area network adapter, a processor and a memory, where the Ethernet adapter is connected to the processor, the wireless local area network adapter is connected to the processor, and the memory is connected to the processor;

the Ethernet adapter receives a first Ethernet data frame sent by a first Ethernet device, where a source MAC address of the first Ethernet data frame is a MAC address of a first Ethernet device connected to the wireless station;

the processor generates a first wireless local area network data frame according to the first Ethernet data frame, where a frame header of the first wireless local area network data frame includes a transmitter MAC address, a receiver MAC address and a basic service set identification BSSID, the transmitter MAC address in the frame header of the first wireless local area network data frame is the source MAC address of the first Ethernet data frame, and the receiver MAC address in the frame header of the first wireless local area network data frame is a MAC address of a wireless access point, and the first wireless local area network data frame carries an A-MSDU, the A-MSDU includes an A-MSDU subframe, the A-MSDU subframe is generated according to the first Ethernet data frame, a source address of the A-MSDU subframe is the virtual interface MAC address corresponding to the source MAC address of the first Ethernet data frame, the virtual interface MAC address is one of a plurality of virtual interface MAC addresses of the wireless station bridge, and a destination address of the A-MSDU subframe is a destination MAC address of the first Ethernet data frame; and the wireless local area network adapter sends the first wireless local area network data frame.

In a first implementation of the tenth aspect, the destination MAC address of the first Ethernet data frame is a broadcast MAC address or a multicast MAC address.

With reference to the tenth aspect or the first implementation of the tenth aspect, in a second implementation of the tenth aspect, after receiving the first Ethernet data frame, the processor generates correspondence between the source MAC address of the first Ethernet data frame and the virtual interface MAC address corresponding to the source MAC address; and the wireless local area network adapter sends, to the wireless access point, the correspondence between the source MAC address of the first Ethernet data frame and the virtual interface MAC address which is of the wireless station bridge and corresponds to the source MAC address.

With reference to the tenth aspect and any one of the first implementation and the second implementation of the tenth aspect, in a third implementation of the tenth aspect, further including:

the wireless local area network adapter receives a third wireless local area network data frame sent by the wireless access point, where the third wireless local area network data frame carries an A-MSDU;

the processor obtains an A-MSDU subframe in the A-MSDU carried by the third wireless local area network data frame;

the processor generates a second Ethernet data frame according to the A-MSDU subframe, where a destination MAC address of the second Ethernet data frame is a destination address of the A-MSDU subframe, and a source MAC address of the second Ethernet data frame is a MAC address corresponding to a source MAC address of the A-MSDU subframe according to correspondence broadcast by the wireless access point; and the Ethernet adapter sends the second Ethernet data frame.

With reference to the tenth aspect and any one of the first implementation and the second implementation of the tenth aspect, in a fourth implementation of the tenth aspect, further including:

the wireless local area network adapter receives a third wireless local area network data frame sent by the wireless access point, where the third wireless local area network data frame carries an A-MSDU, and a receiver MAC address in a frame header of the third wireless local area network data frame is a broadcast MAC address or a multicast MAC address;

the processor obtains an A-MSDU subframe in the A-MSDU carried by the third wireless local area network data frame; and in a case that a source address of the A-MSDU subframe is the virtual interface MAC address of the wireless station bridge, the processor discards the A-MSDU subframe.

It can be known from the foregoing technical solutions that in this application, a wireless station bridge sets a virtual interface MAC address for an Ethernet device, so that the Ethernet device connected to the wireless station bridge has a corresponding MAC address in a wireless local area network, and therefore, the Ethernet device can access the wireless local area network by using a bridging function of the wireless station bridge.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Specific implementation processes of the present invention are described by using examples in the following through embodiments. Apparently, the embodiments to be described in the following are only a part rather than all of the embodiments of the present invention. Based on the embodiments of the present invention, all other embodiments obtained by a person of ordinary skill in the art without creative efforts shall fall within the protection scope of the present invention.

Figure 1:
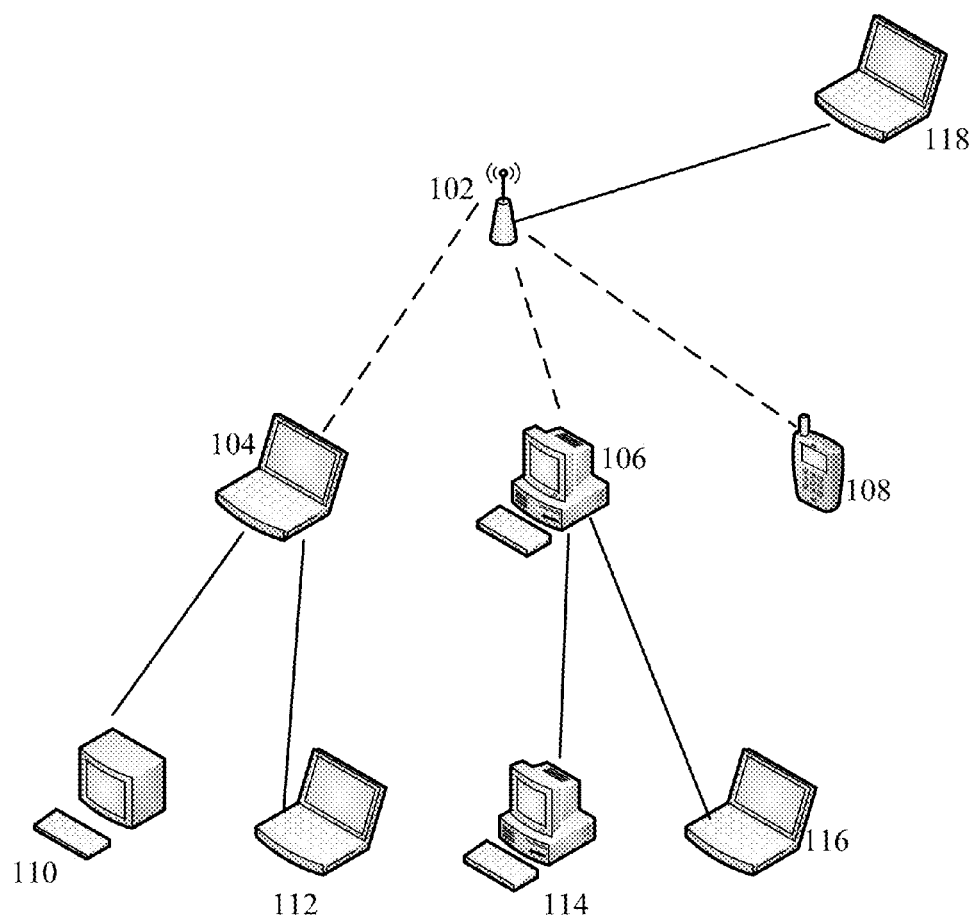
FIG. 1 is a schematic diagram of a network system according to an embodiment of the present invention.

FIG. 1 is a schematic diagram of a network system according to an embodiment of the present invention. In the schematic diagram of the network system, solid lines represent wired connections, and dashed lines represent wireless connections. 102 is a wireless AP. 104, 106 and 108 are wireless stations associated with the wireless AP. 104 and 106 also provide a bridging function, and therefore, may also be referred to as wireless station bridges (STA bridge). 110, 112, 114, 116 and 118 are devices connected to a network through an Ethernet, and are referred to as Ethernet devices in the embodiments of the present invention. 110 and 112 are connected to 104, and 114 and 116 are connected to 106. Specific forms of the devices in FIG. 1 are merely exemplary, and besides a mobile phone and various types of computers shown in FIG. 1, the wireless stations and the Ethernet devices may also be tablet computers, personal digital assistants (PDA), mobile Internet devices (MID), e-book readers or the like.

Figure 2:
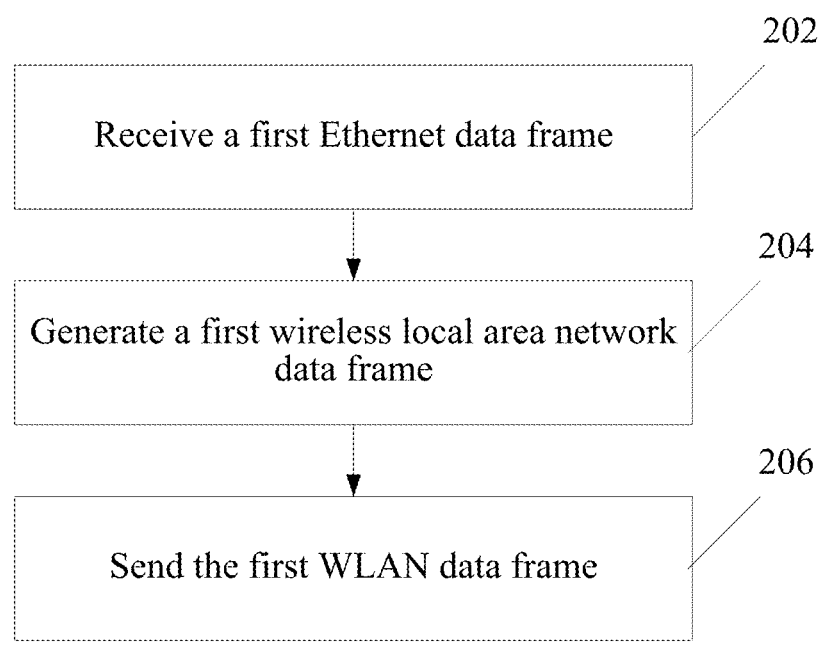
FIG. 2 is a flowchart of a method according to an embodiment of the present invention.

Referring to FIG. 1 and FIG. 2, an embodiment of the present invention provides a method for accessing a wireless local area network. FIG. 2 is a flowchart of a method according to an embodiment of the present invention. The method includes:

202: A first wireless station bridge receives a first Ethernet data frame sent by a first Ethernet device, where a source media access control (MAC) address of the first Ethernet data frame is a MAC address of the first Ethernet device connected to the first wireless station bridge.

The first wireless station bridge in the embodiment of the present invention may be any wireless station bridge, and for ease of description, the first wireless station bridge in the following description is 104 in FIG. 1. The first wireless station bridge may also be referred to as a first wireless station, and the first wireless station provides a bridging function.

The first Ethernet device is a device connected to the first wireless station bridge through an Ethernet, for example, 110 or 112 in FIG. 1.

One wireless station bridge generates a plurality of virtual interface MAC addresses. Any one of a plurality of virtual interface MAC addresses generated by one wireless station bridge is different from a MAC address of the wireless station bridge itself. Any one of a plurality of virtual interface MAC addresses generated by one wireless station bridge is different from a MAC address of an Ethernet device connected to the wireless station bridge.

After receiving the first Ethernet data frame, the first wireless station bridge generates correspondence between the source MAC address of the first Ethernet data frame and one virtual interface MAC address. The virtual interface MAC address is one of a plurality of virtual interface MAC addresses generated by the first wireless station bridge.

For example, the first wireless station bridge may generate the correspondence in the following several manners.

The first wireless station bridge may generate a plurality of virtual interface MAC addresses immediately when it becomes associated with a wireless AP. After receiving the first Ethernet data frame, the first wireless station bridge selects one unused virtual interface MAC address from the plurality of virtual interface MAC addresses having already been generated, and generates correspondence between the source MAC address of the first Ethernet data frame and the unused virtual interface MAC address. The selected virtual interface MAC address becomes a used virtual interface MAC address.

Alternatively, the first wireless station bridge may also generate one virtual interface MAC address corresponding to the source MAC address of the first Ethernet data frame after receiving the first Ethernet data frame. The generated virtual interface MAC address is different from the virtual interface MAC addresses having already been generated by the first wireless station bridge. The first wireless station bridge generates correspondence between the source MAC address of the first Ethernet data frame and the generated virtual interface MAC address.

Alternatively, the first wireless station bridge may also generate a plurality of virtual interface MAC addresses immediately when it becomes associated with a wireless AP. After receiving the first Ethernet data frame, the first wireless station bridge newly generates a virtual interface MAC address corresponding to the source MAC address of the first Ethernet data frame if all the plurality of virtual interface MAC addresses having already been generated has been used. The newly generated virtual interface MAC address is different from the virtual interface MAC addresses having already been generated by the first wireless station bridge. The first wireless station bridge generates correspondence between the source MAC address of the first Ethernet data frame and the newly generated virtual interface MAC address.

The first wireless station bridge may also generate virtual interface MAC addresses in other manners, and no matter which manner is used, there is one-to-one correspondence between a plurality of used virtual interface MAC addresses of the first wireless station bridge and MAC addresses of a plurality of Ethernet devices having communicated with the first wireless station bridge. That is to say, all source MAC addresses in correspondences, which are between source MAC addresses of all Ethernet data frames and virtual interface MAC addresses and has already been generated by the first wireless station bridge, are bijective mapped to all the virtual interface MAC addresses in the correspondences.

One wireless station bridge may generate a virtual interface MAC address at random, or may generate a virtual interface MAC address according to a preset rule. For example, the wireless station bridge may set 24 most significant bits (MSBs) of the generated virtual interface MAC address to a fixed value, for example, an Organizationally Unique Identifier (OUI), where the OUI may be an OUI of the wireless station bridge itself, that is, be the same as 24 MSBs in the MAC address of the wireless station bridge itself, or may be a preset specific OUI. The 24 MSBs are followed by an association identifier (AID) of the wireless station bridge on an AP, and because 2 MSBs of the AID are a fixed value, the wireless station bridge may only set 14 least significant bits (LSBs) of the AID here. 10 LSBs of the virtual interface MAC address are reserved bits, padding or random numbers. Optionally, if after receiving an Ethernet data frame, the wireless station bridge newly generates a virtual interface MAC address corresponding to the source MAC address of the Ethernet data frame, the wireless station bridge may calculate, according to the source MAC address and by using a preset algorithm, the virtual interface MAC address to be generated.

After generating the correspondence, the first wireless station bridge sends the correspondence to the wireless AP associated with the first wireless station bridge. After receiving the correspondence, the wireless AP broadcasts the correspondence. According to the correspondence, the wireless AP or another wireless station bridge may know which Ethernet device a frame or subframe including the virtual interface MAC address is from.

204: The first wireless station bridge generates a first wireless local area network data frame (hereinafter briefly referred to as WLAN data frame) according to the first Ethernet data frame. A frame header of the first WLAN data frame includes a transmitter MAC address and a receiver MAC address. The transmitter MAC address in the frame header of the first WLAN data frame is a virtual interface MAC address corresponding to the source MAC address of the first Ethernet data frame, and the virtual interface MAC address is one of a plurality of virtual interface MAC addresses of the first wireless station bridge.

A WLAN data frame is a frame for transmitting data in a wireless local area network. The WLAN data frame includes a frame header and a MAC service data unit (MSDU), or includes a frame header and an aggregate MSDU (A-MSDU). The MSDU includes a part in a received Ethernet data frame other than a source MAC address and a destination MAC address. The A-MSDU aggregates a plurality of MSDUs into one WLAN data frame for transmission. Only a plurality of MSDUs having a same transmitter address and a same receiver address in a WLAN is aggregated into one A-MSDU for transmission. One A-MSDU includes a plurality of A-MSDU subframes, and each A-MSDU subframe includes an A-MSDU subframe header and an MSDU. The A-MSDU subframe header includes a source address (SA), a destination address (DA), and a length of the MSDU in the A-MSDU subframe.

The frame header of the WLAN data frame is a MAC header. The number of MAC addresses in a frame header of a WLAN data frame transmitted between a wireless STA and a wireless AP is 3. The MAC addresses in the frame header of the WLAN data frame always include a transmitter address and a receiver address, and because the transmitter address and the receiver address are MAC addresses, they are respectively referred to as a transmitter MAC address and a receiver MAC address in the following. If the WLAN data frame carries an MSDU, the MAC addresses in the frame header of the WLAN data frame further include a destination MAC address. If the WLAN data frame carries an A-MSDU, the MAC addresses in the frame header of the WLAN data frame further include a basic service set identification (BSSID), that is, a MAC address of the wireless AP.

The first WLAN data frame is sent by the first wireless station bridge to the wireless AP, so the receiver MAC address in the frame header of the first WLAN data frame is the MAC address of the wireless AP.

Generally, a transmitter MAC address of a WLAN data frame sent by a wireless station is a MAC address of the wireless station. If a wireless station bridge uses a MAC address of the wireless station bridge itself as a transmitter MAC address, the wireless AP receiving the WLAN data frame and the wireless station from which the WLAN data frame is forwarded by the wireless AP cannot distinguish whether a device sending the WLAN data frame is the wireless station bridge itself or is a device connected to the wireless station bridge through an Ethernet. If a wireless station bridge uses a MAC address of a received Ethernet data frame as a transmitter MAC address of a WLAN data frame, the wireless AP cannot recognize the transmitter MAC address of the WLAN data frame.

In the embodiment of the present invention, the first wireless station bridge generates one virtual interface MAC address for each Ethernet device connected to the first wireless station bridge through an Ethernet, and when sending the first WLAN data frame, uses the virtual interface MAC address corresponding to the source MAC address of the first Ethernet data frame as the transmitter MAC address of the first WLAN data frame. The Ethernet device connected to the first wireless station bridge through the Ethernet may be a device directly connected to the first wireless station bridge, or may be a device connected to the first wireless station bridge through a network switch or an Ethernet hub.

If the first WLAN data frame carries an MSDU, the destination MAC address in the frame header of the first WLAN data frame is a destination MAC address of the first Ethernet data frame.

The first wireless station bridge may aggregate a plurality of MSDUs. The first wireless station bridge generates the first WLAN data frame according to the first Ethernet data frame and other Ethernet data frames, and the first WLAN data frame carries an A-MSDU. The A-MSDU includes a plurality of A-MSDU subframes, where one of the A-MSDU subframes is generated according to the first Ethernet data frame. The destination address of the A-MSDU subframe is the destination MAC address of the first Ethernet data frame. If the first Ethernet data frame is a unicast data frame, the source address of the A-MSDU subframe is the source MAC address of the first Ethernet data frame. If the first Ethernet data frame is a broadcast data frame or a multicast data frame, the destination address of the A-MSDU subframe is the destination MAC address of the first Ethernet data frame, that is, a broadcast MAC address or a multicast MAC address, and the source address of the A-MSDU subframe is the virtual interface MAC address corresponding to the source MAC address of the first Ethernet data frame. Optionally, the transmitter MAC address of the first WLAN data frame carrying the A-MSDU may be the MAC address of the first wireless station bridge instead of the virtual interface MAC address.

206: The first wireless station bridge sends the first WLAN data frame.

If the wireless AP receives a WLAN data frame sent by a second wireless station bridge, where the WLAN data frame carries an MSDU, and a destination MAC address in a frame header of the WLAN data frame is a MAC address of an Ethernet device connected to the first wireless station bridge, for example, the first Ethernet device, the wireless AP sends a second WLAN data frame to the first wireless station bridge. The second wireless station bridge may also be referred to as a second wireless station, and the second wireless station provides a bridging function. A receiver MAC address in a frame header of the second WLAN data frame is a virtual interface MAC address corresponding to the destination MAC address in the frame header of the WLAN data frame sent by the second wireless station bridge, according to the correspondence which is between the source MAC address of the first Ethernet data frame and the virtual interface MAC address and is sent by the first wireless station bridge. A transmitter MAC address in the frame header of the second WLAN data frame is the MAC address of the wireless AP. If the second WLAN data frame carries an MSDU, the MSDU is the MSDU carried by the WLAN data frame sent by the second wireless station bridge, and the MAC addresses in the frame header of the second WLAN data frame further include a source MAC address. The source MAC address is the transmitter MAC address in the frame header of the WLAN data frame sent by the second wireless station bridge. If the second WLAN data frame carries an A-MSDU, an MSDU in one A-MSDU subframe in the A-MSDU is the MSDU carried by the WLAN data frame sent by the second wireless station bridge, the destination address of the A-MSDU subframe is the destination MAC address in the frame header of the WLAN data frame sent by the second wireless station bridge, and the source address of the A-MSDU subframe is the transmitter MAC address in the frame header of the WLAN data frame sent by the second wireless station bridge. If the second WLAN data frame carries an A-MSDU, the MAC addresses in the frame header of the second WLAN data frame further include the BSSID.

If the wireless AP receives a WLAN data frame sent by the second wireless station bridge, where the WLAN data frame carries an A-MSDU, and a destination address of one A-MSDU subframe in the A-MSDU carried by the WLAN data frame is a MAC address of an Ethernet device connected to the first wireless station bridge, for example, the first Ethernet device, the wireless AP sends a second WLAN data frame to the first wireless station bridge. The wireless AP receives correspondence which is between a MAC address of an Ethernet device connected to the second wireless station bridge and a virtual interface MAC address and is sent by the second wireless station bridge. The transmitter MAC address in the frame header of the second WLAN data frame is the MAC address of the wireless AP. If the second WLAN data frame carries an MSDU, the MSDU is an MSDU of an A-MSDU subframe whose destination address is a MAC address of an Ethernet device connected to the first wireless station bridge and which is in the A-MSDU carried by the WLAN data frame sent by the second wireless station bridge. The receiver MAC address in the frame header of the second WLAN data frame is a virtual interface MAC address corresponding to the destination address of the A-MSDU subframe whose destination address is a MAC address of an Ethernet device connected to the first wireless station bridge and which is in the A-MSDU carried by the WLAN data frame sent by the second wireless station bridge, according to the correspondence which is between the source MAC address of the first Ethernet data frame and the virtual interface MAC address and is sent by the first wireless station bridge. The MAC addresses in the frame header of the second WLAN data frame further include a source MAC address. The source MAC address in the frame header of the second WLAN data frame is the transmitter MAC address in the frame header of the WLAN data frame sent by the second wireless station bridge. Alternatively, the source MAC address in the frame header of the second WLAN data frame is a virtual interface MAC address corresponding to the source address of the A-MSDU subframe whose destination address is a MAC address of an Ethernet device connected to the first wireless station bridge and which is in the A-MSDU carried by the WLAN data frame sent by the second wireless station bridge, according to the correspondence which is between the MAC address of the Ethernet device connected to the second wireless station bridge and the virtual interface MAC address and is sent by the second wireless station bridge. If the second WLAN data frame carries an A-MSDU, one A-MSDU subframe in the A-MSDU is the A-MSDU subframe whose destination address is a MAC address of an Ethernet device connected to the first wireless station bridge and which is in the A-MSDU carried by the WLAN data frame sent by the second wireless station bridge. The receiver MAC address in the frame header of the second WLAN data frame is the MAC address of the first wireless station bridge. Alternatively, the receiver MAC address in the frame header of the second WLAN data frame is the virtual interface MAC address corresponding to the destination address of the A-MSDU subframe whose destination address is a MAC address of an Ethernet device connected to the first wireless station bridge and which is in the A-MSDU carried by the WLAN data frame sent by the second wireless station bridge, according to the correspondence which is between the source MAC address of the first Ethernet data frame and the virtual interface MAC address and is sent by the first wireless station bridge. The MAC addresses in the frame header of the second WLAN data frame further include the BSSID.

After receiving the correspondence which is between the MAC address of the Ethernet device connected to the second wireless station bridge and the virtual interface MAC address and is sent by the second wireless station bridge, the wireless AP broadcasts the correspondence. The first wireless station bridge receives the correspondence. The first wireless station bridge receives the second WLAN data frame sent by the wireless AP. If the second WLAN data frame carries an MSDU, the first wireless station generates a second Ethernet data frame according to the second WLAN data frame. The destination MAC address of the second Ethernet data frame is a MAC address corresponding to the receiver MAC address in the frame header of the second WLAN data frame according to the correspondence between the source MAC address of the first Ethernet data frame and the virtual interface MAC address corresponding to the source MAC address. Because the receiver MAC address in the frame header of the second WLAN data frame is the virtual interface MAC address corresponding to the MAC address of the Ethernet device connected to the first wireless station bridge, the destination MAC address in the frame header of the second Ethernet data frame is the MAC address of the Ethernet device connected to the first wireless station bridge. The source MAC address of the second Ethernet data frame is a MAC address corresponding to the source MAC address in the frame header of the second WLAN data frame according to correspondence between a virtual interface MAC address of the second wireless station bridge and a MAC address of an Ethernet device connected to the second wireless station bridge. Because the source MAC address in the frame header of the second WLAN data frame is the transmitter MAC address in the frame header of the WLAN data frame sent by the second wireless station bridge, that is, a virtual interface MAC address corresponding to a MAC address of an Ethernet device that sends an Ethernet data frame to the second wireless station bridge, the source MAC address of the second Ethernet data frame is the MAC address of the Ethernet device that sends the Ethernet data frame to the second wireless station bridge. If the second WLAN data frame carries an A-MSDU, the first wireless station bridge generates a second Ethernet data frame according to an A-MSDU subframe in the A-MSDU carried by the second WLAN data frame. The destination MAC address and the source MAC address of the second Ethernet data frame are respectively the destination address and the source address of the A-MSDU subframe.

If the first Ethernet data frame is a broadcast data frame or a multicast data frame, in a case that the first WLAN data frame carries an MSDU, the destination MAC address in the frame header of the first WLAN data frame is the destination MAC address of the first Ethernet data frame, that is, the broadcast MAC address or the multicast MAC address. After receiving the first WLAN data frame, the wireless AP sends a third WLAN data frame. A receiver MAC address in a frame header of the third WLAN data frame is the destination MAC address in the frame header of the first WLAN data frame, that is, the broadcast MAC address or the multicast MAC address. A transmitter MAC address in the frame header of the third WLAN data frame is the MAC address of the wireless AP. If the third WLAN data frame carries an MSDU, the MSDU is the MSDU carried by the first WLAN data frame, and the MAC addresses in the frame header of the third WLAN data frame further include a source MAC address. The source MAC address is the transmitter MAC address in the frame header of the first WLAN data frame. If the third WLAN data frame carries an A-MSDU, an MSDU in one A-MSDU subframe in the A-MSDU is the MSDU carried by the first WLAN data frame, the destination address of the A-MSDU subframe is the destination MAC address in the frame header of the first WLAN data frame, that is, the broadcast MAC address or the multicast MAC address, and the source address of the A-MSDU subframe is the transmitter MAC address in the frame header of the first WLAN data frame. If the third WLAN data frame carries an A-MSDU, the MAC addresses in the frame header of the third WLAN data frame further include the BSSID.

If the first Ethernet data frame is a broadcast data frame or a multicast data frame, in a case that the first WLAN data frame carries an A-MSDU, the destination address of the A-MSDU subframe which corresponds to the first Ethernet data frame and is in the A-MSDU carried by the first WLAN data frame is the destination MAC address of the first Ethernet data frame, that is, the broadcast MAC address or the multicast MAC address, and the source address of the A-MSDU subframe is the virtual interface MAC address corresponding to the source MAC address of the first Ethernet data frame. After receiving the first WLAN data frame, the wireless AP sends a third WLAN data frame. A receiver MAC address in a frame header of the third WLAN data frame is the destination address of the A-MSDU subframe, that is, the broadcast MAC address or the multicast MAC address. A transmitter MAC address in the frame header of the third WLAN data frame is the MAC address of the wireless AP. If the third WLAN data frame carries an MSDU, the MSDU is an MSDU in an A-MSDU subframe which corresponds to the first Ethernet data frame and is in the A-MSDU carried by the first WLAN data frame. The MAC addresses in the frame header of the third WLAN data frame further include a source MAC address. The source MAC address in the frame header of the third WLAN data frame is the source MAC address of the A-MSDU subframe which corresponds to the first Ethernet data frame and is in the A-MSDU carried by the first WLAN data frame. If the third WLAN data frame carries an A-MSDU, one A-MSDU subframe in the A-MSDU is the A-MSDU subframe which corresponds to the first Ethernet data frame and is in the A-MSDU carried by the first WLAN data frame. If the third WLAN data frame carries an A-MSDU, the MAC addresses in the frame header of the third WLAN data frame further include the BSSID.

The second wireless station bridge receives the third WLAN data frame, and if the third WLAN data frame carries an A-MSDU, the second wireless station bridge generates a second Ethernet data frame according to the A-MSDU subframe in the A-MSDU carried by the third WLAN data frame. The destination MAC address of the second Ethernet data frame is the destination address of the A-MSDU subframe. The source MAC address of the second Ethernet data frame is a MAC address corresponding to the source MAC address of the A-MSDU subframe according to the correspondence which is between the source MAC address of the first Ethernet data frame and the virtual interface MAC address corresponding to the source MAC address and is broadcast by the wireless AP. Because the source address of the A-MSDU subframe is the virtual interface MAC address corresponding to the source MAC address of the first Ethernet data frame, the source MAC address of the second Ethernet data frame is the MAC address of the first Ethernet device.

Because the receiver MAC address in the frame header of the third WLAN data frame is the broadcast MAC address or the multicast MAC address, the first wireless station bridge also receives the third WLAN data frame. If the third WLAN data frame carries an MSDU, the first wireless station bridge checks the source MAC address in the frame header of the third WLAN data frame. If the source MAC address in the frame header of the third WLAN data frame is a virtual interface MAC address of the first wireless station bridge, that is, the source MAC address is one of a plurality of virtual interface MAC addresses of the first wireless station bridge, the first wireless station bridge discards the third WLAN data frame. If the third WLAN data frame carries an A-MSDU, the first wireless station bridge obtains each A-MSDU subframe in the A-MSDU carried by the third WLAN data frame. The first wireless station bridge checks the source address of the obtained A-MSDU subframe, and if the source address of the A-MSDU subframe is a virtual interface MAC address of the first wireless station bridge, that is, the source address is one of a plurality of virtual interface MAC addresses of the first wireless station bridge, the first wireless station bridge discards the A-MSDU subframe.

Figure 3:
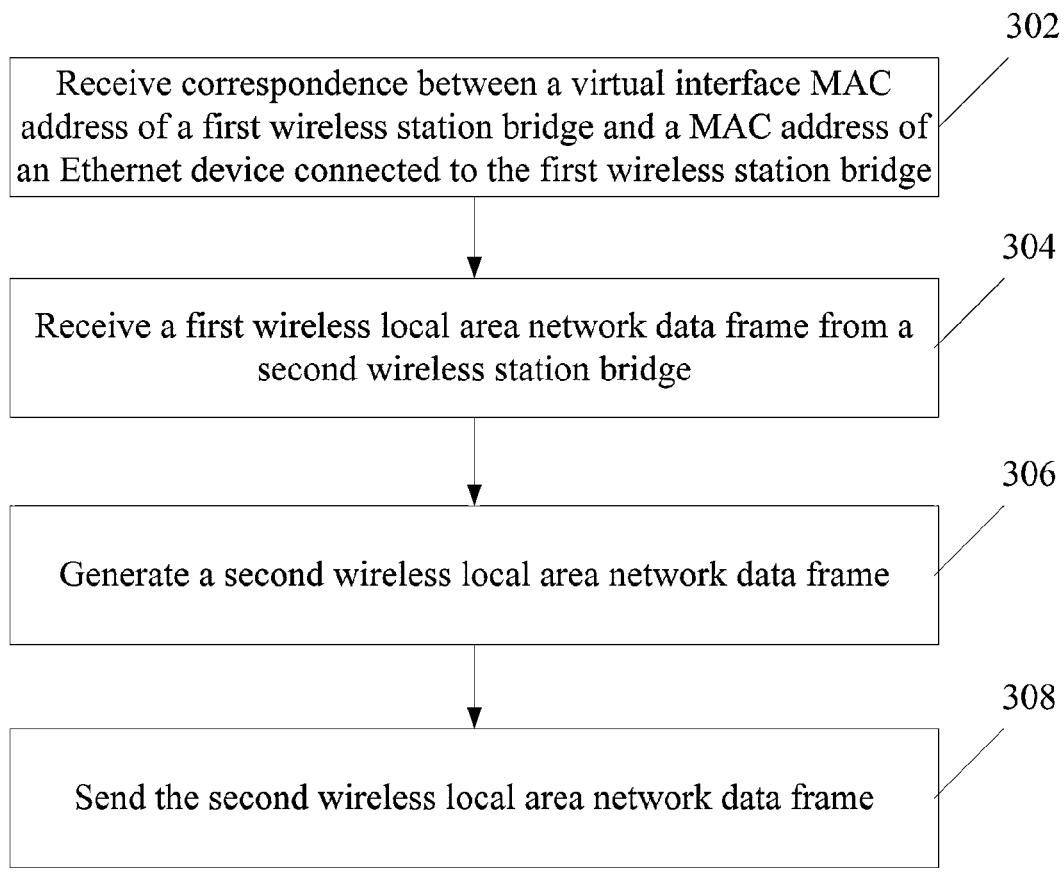
FIG. 3 is a flowchart of a method according to an embodiment of the present invention.

The embodiment shown in FIG. 2 is described with an emphasis on a working method of the wireless station bridge, and for a working method of the wireless access point in this embodiment, refer to an embodiment shown in FIG. 3.

Referring to FIG. 1 and FIG. 3, an embodiment of the present invention provides a method for accessing a wireless local area network. FIG. 3 is a flowchart of a method according to an embodiment of the present invention. The method includes:

302: A wireless access point receives correspondence which is between a virtual interface MAC address of a first wireless station bridge and a MAC address of an Ethernet device connected to the first wireless station bridge and is from the first wireless station bridge.

The first wireless station bridge in the embodiment of the present invention may be any wireless station bridge, and for ease of description, the first wireless station bridge in the following description is 104 in FIG. 1.

One wireless station bridge generates a plurality of virtual interface MAC addresses. Any one of a plurality of virtual interface MAC addresses generated by one wireless station bridge is different from a MAC address of the wireless station bridge itself. Any one of a plurality of virtual interface MAC addresses generated by one wireless station bridge is different from a MAC address of an Ethernet device connected to the wireless station bridge.

After receiving an Ethernet data frame, the first wireless station bridge generates correspondence between a source MAC address of the Ethernet data frame and one virtual interface MAC address. The virtual interface MAC address is one of a plurality of virtual interface MAC addresses generated by the first wireless station bridge.

For example, the first wireless station bridge may generate the correspondence in the following several manners.

The first wireless station bridge may generate a plurality of virtual interface MAC addresses immediately when it becomes associated with a wireless AP. After receiving the Ethernet data frame, the first wireless station bridge selects one unused virtual interface MAC address from the plurality of virtual interface MAC addresses having already been generated, and generates correspondence between the source MAC address of the Ethernet data frame and the unused virtual interface MAC address. The selected virtual interface MAC address becomes a used virtual interface MAC address.

Alternatively, the first wireless station bridge may also generate one virtual interface MAC address corresponding to the source MAC address of the Ethernet data frame after receiving the Ethernet data frame. The generated virtual interface MAC address is different from the virtual interface MAC addresses having already been generated by the first wireless station bridge. The first wireless station bridge generates correspondence between the source MAC address of the Ethernet data frame and the generated virtual interface MAC address.

Alternatively, the first wireless station bridge may also generate a plurality of virtual interface MAC addresses immediately when it becomes associated with a wireless AP. After receiving the Ethernet data frame, the first wireless station bridge newly generates a virtual interface MAC address corresponding to the source MAC address of the Ethernet data frame if all the plurality of virtual interface MAC addresses having already been generated has been used. The newly generated virtual interface MAC address is different from the virtual interface MAC addresses having already been generated by the first wireless station bridge. The first wireless station bridge generates correspondence between the source MAC address of the Ethernet data frame and the newly generated virtual interface MAC address.

The first wireless station bridge may also generate virtual interface MAC addresses in other manners, and no matter which manner is used, there is one-to-one correspondence between the plurality of used virtual interface MAC addresses of the first wireless station bridge and MAC addresses of a plurality of Ethernet devices having communicated with the first wireless station bridge. That is to say, all source MAC addresses in correspondences, which are between source MAC addresses of all Ethernet data frames and virtual interface MAC addresses and has already been generated by the first wireless station bridge, are bijective mapped to all the virtual interface MAC addresses in the correspondences.

One wireless station bridge may generate a virtual interface MAC address at random, or may generate a virtual interface MAC address according to a preset rule. For example, the wireless station bridge may set 24 MSBs of the generated virtual interface MAC address to a fixed value, for example, an OUI; the 24 MSBs are followed by an AID of the wireless station bridge on an AP, and because 2 MSBs of the AID are a fixed value, the wireless station bridge may only set 14 LSBs of the AID here. 10 LSBs of the virtual interface MAC address are reserved bits, padding or random numbers.

Optionally, if after receiving an Ethernet data frame, the wireless station bridge newly generates a virtual interface MAC address corresponding to a source MAC address of the Ethernet data frame, the wireless station bridge may calculate, according to the source MAC address and by using a preset algorithm, the virtual interface MAC address to be generated.

After generating the correspondence, the first wireless station bridge sends the correspondence to the wireless AP associated with the first wireless station bridge. After receiving the correspondence, the wireless AP broadcasts the correspondence.

The wireless access point may also receive correspondence which is between a virtual interface MAC address of a second wireless station bridge and a MAC address of an Ethernet device connected to the second wireless station bridge and is from the second wireless station bridge. After receiving the correspondence, the wireless AP broadcasts the correspondence. The first wireless station bridge receives the correspondence.

304: The wireless access point receives a first wireless local area network data frame from the second wireless station bridge. A frame header of the first wireless local area network data frame includes a transmitter MAC address and a receiver MAC address.

The second wireless station bridge receives an Ethernet data frame sent by an Ethernet device, where a source MAC address of the Ethernet data frame is a MAC address of an Ethernet device connected to the second wireless station bridge. The second wireless station bridge generates a first WLAN data frame according to the Ethernet data frame. A transmitter MAC address in a frame header of the first WLAN data frame is a virtual interface MAC address corresponding to the source MAC address of the Ethernet data frame, and the virtual interface MAC address is one of a plurality of virtual interface MAC addresses of the second wireless station bridge. Alternatively, in a case that the first WLAN data frame carries an A-MSDU and a source address of an A-MSDU subframe in the A-MSDU is the virtual interface MAC address corresponding to the source MAC address of the Ethernet data frame, the transmitter MAC address in the frame header of the first WLAN data frame may be a MAC address of the second wireless station bridge.

A WLAN data frame is a frame for transmitting data in a WLAN. The WLAN data frame includes a frame header and an MSDU, or includes a frame header and an A-MSDU. One A-MSDU includes a plurality of A-MSDU subframes, and each A-MSDU subframe includes an A-MSDU subframe header and an MSDU. The A-MSDU subframe header includes a source address, a destination address, and a length of the MSDU in the A-MSDU subframe.

The frame header of the WLAN data frame is a MAC header. The number of MAC addresses in a frame header of a WLAN data frame transmitted between a wireless STA and a wireless AP is 3.

306: In a case that a destination device of the first wireless local area network data frame is a device connected to the wireless access point through the first wireless station bridge, the wireless access point generates a second wireless local area network data frame according to the first wireless local area network data frame. A frame header of the second wireless local area network data frame includes a transmitter MAC address and a receiver MAC address. The receiver MAC address in the frame header of the second wireless local area network data frame is a virtual interface MAC address corresponding to a MAC address of the destination device of the first wireless local area network data frame according to the correspondence between the virtual interface MAC address of the first wireless station bridge and the MAC address of the Ethernet device connected to the first wireless station bridge.

The transmitter MAC address in the frame header of the second WLAN data frame is the MAC address of the wireless AP.

(1) If the first WLAN data frame carries an MSDU, the frame header of the first WLAN data frame includes a destination MAC address. The destination MAC address is the MAC address of the destination device. The destination device of the first WLAN data frame is a device connected to the wireless access point through the first wireless station bridge, that is, the destination MAC address in the frame header of the first WLAN data frame is a MAC address of a device connected to the wireless access point through the first wireless station bridge.

If the second WLAN data frame carries an MSDU, the MSDU is the MSDU carried by the WLAN data frame sent by the second wireless station bridge, and the MAC addresses in the frame header of the second WLAN data frame further include a source MAC address. The source MAC address is the transmitter MAC address in the frame header of the first WLAN data frame.

If the second WLAN data frame carries an A-MSDU, an MSDU in one A-MSDU subframe in the A-MSDU is the MSDU carried by the first WLAN data frame, the destination address of the A-MSDU subframe is the destination MAC address in the frame header of the first WLAN data frame, and the source address of the A-MSDU subframe is the transmitter MAC address in the frame header of the first WLAN data frame. The MAC addresses in the frame header of the second WLAN data frame further include the BSSID. In this case, alternatively, the receiver MAC address in the frame header of the second wireless local area network data frame may be the MAC address of the second wireless station bridge.

If a destination device of a WLAN data frame which is received by the wireless AP and is from the second wireless station bridge, for example, a third WLAN data frame, is a device connected to the wireless AP through an Ethernet, for example, the device 118 in FIG. 1, the wireless AP generates the first Ethernet data frame according to the third WLAN data frame. If the third WLAN data frame carries an MSDU, the frame header of the third WLAN data frame includes a destination MAC address, a transmitter MAC address and a receiver MAC address. The destination device of the third WLAN data frame is a device connected to the wireless AP through an Ethernet, that is, the destination MAC address in the frame header of the third WLAN data frame is a MAC address of a device connected to the wireless AP through an Ethernet. The destination MAC address of the first Ethernet data frame is the destination MAC address in the frame header of the third WLAN data frame. The source MAC address of the first Ethernet data frame is a MAC address corresponding to the transmitter MAC address in the frame header of the third WLAN data frame according to the correspondence between the virtual interface MAC address of the second wireless station bridge and the MAC address of the Ethernet device connected to the second wireless station bridge. Because the transmitter MAC address in the frame header of the third WLAN data frame is a virtual interface MAC address corresponding to a MAC address of an Ethernet device that sends an Ethernet data frame to the second wireless station bridge, the source MAC address of the first Ethernet data frame is the MAC address of the Ethernet device that sends the Ethernet data frame to the second wireless station bridge. If the third WLAN data frame carries an A-MSDU, the frame header of the third WLAN data frame includes the BSSID, a transmitter MAC address and a receiver MAC address. The destination device of the third WLAN data frame is a device connected to the wireless AP through an Ethernet, that is, a destination address of any one of a plurality of A-MSDU subframes in the A-MSDU carried by the third WLAN data frame is a MAC address of a device connected to the wireless AP through an Ethernet. Specifically, the wireless AP generates the first Ethernet data frame according to an A-MSDU subframe whose destination address is a MAC address of a device connected to the wireless AP through an Ethernet and which is in the third WLAN data frame. The destination MAC address of the first Ethernet data frame is the destination address of the A-MSDU subframe. The source MAC address of the first Ethernet data frame is the source address of the A-MSDU subframe.

If the destination MAC address in the frame header of the first WLAN data frame is a broadcast MAC address or a multicast MAC address, the wireless AP sends a fifth WLAN data frame after receiving the first WLAN data frame. A receiver MAC address in a frame header of the fifth WLAN data frame is the destination MAC address in the frame header of the first WLAN data frame, that is, the broadcast MAC address or the multicast MAC address. A transmitter MAC address in the frame header of the fifth WLAN data frame is the MAC address of the wireless AP. If the fifth WLAN data frame carries an MSDU, the MSDU is the MSDU carried by the first WLAN data frame, and the MAC addresses in the frame header of the fifth WLAN data frame further include a source MAC address. The source MAC address is the transmitter MAC address in the frame header of the first WLAN data frame. If the fifth WLAN data frame carries an A-MSDU, an MSDU in one A-MSDU subframe in the A-MSDU is the MSDU carried by the first WLAN data frame, the destination address of the A-MSDU subframe is the destination MAC address in the frame header of the first WLAN data frame, that is, the broadcast MAC address or the multicast MAC address, and the source address of the A-MSDU subframe is the transmitter MAC address in the frame header of the first WLAN data frame. The MAC addresses in the frame header of the fifth WLAN data frame further include the BSSID.

(2) If the first WLAN data frame carries an A-MSDU, the A-MSDU carried by the first WLAN data frame includes a plurality of A-MSDU subframes. Destination addresses of the plurality of A-MSDU subframes are the MAC addresses of the destination devices. The destination device of the first WLAN data frame is a device connected to the wireless access point through the first wireless station bridge, that is, a destination address of any one of the plurality of A-MSDU subframes in the A-MSDU carried by the first WLAN data frame is a MAC address of a device connected to the wireless access point through the first wireless station bridge.

The transmitter MAC address in the frame header of the second WLAN data frame is the MAC address of the wireless AP.

If the second WLAN data frame carries an MSDU, the MSDU is an MSDU of an A-MSDU subframe whose destination address is a MAC address of an Ethernet device connected to the first wireless station bridge and which is in the A-MSDU carried by the first WLAN data frame. The receiver MAC address in the frame header of the second WLAN data frame is a virtual interface MAC address corresponding to the destination address of the A-MSDU subframe whose destination address is a MAC address of an Ethernet device connected to the first wireless station bridge and which is in the A-MSDU carried by the first WLAN data frame, according to the correspondence which is between the virtual interface MAC address of the first wireless station bridge and the MAC address of the Ethernet device connected to the first wireless station bridge and is sent by the first wireless station bridge. The MAC addresses in the frame header of the second WLAN data frame further include a source MAC address. The source MAC address in the frame header of the second WLAN data frame is a virtual interface MAC address corresponding to the source address of the A-MSDU subframe whose destination address is a MAC address of an Ethernet device connected to the first wireless station bridge and which is in the A-MSDU carried by the first WLAN data frame, according to the correspondence which is between the MAC address of the Ethernet device connected to the second wireless station bridge and the virtual interface MAC address and is sent by the second wireless station bridge. Alternatively, if the transmitter MAC address in the frame header of the first WLAN data frame is a virtual interface MAC address corresponding to the source MAC address of the Ethernet data frame received by the second wireless station bridge, the source MAC address in the frame header of the second WLAN data frame may be the transmitter MAC address in the frame header of the first WLAN data frame.

If the second WLAN data frame carries an A-MSDU, one A-MSDU subframe in the A-MSDU is the A-MSDU subframe whose destination address is a MAC address of an Ethernet device connected to the first wireless station bridge and which is in the A-MSDU carried by the first WLAN data frame. The receiver MAC address in the frame header of the second WLAN data frame is the MAC address of the first wireless station bridge. Alternatively, the receiver MAC address in the frame header of the second WLAN data frame is the virtual interface MAC address corresponding to the destination address of the A-MSDU subframe whose destination address is a MAC address of an Ethernet device connected to the first wireless station bridge and which is in the A-MSDU carried by the first WLAN data frame, according to the correspondence which is between the virtual interface MAC address of the first wireless station bridge and the MAC address of the Ethernet device connected to the first wireless station bridge and is sent by the first wireless station bridge. The MAC addresses in the frame header of the second WLAN data frame further include the BSSID.

If a destination address of one A-MSDU subframe in the A-MSDU carried by the first WLAN data frame is a broadcast MAC address or a multicast MAC address, the wireless AP sends a fifth WLAN data frame after receiving the first WLAN data frame. A receiver MAC address in a frame header of the fifth WLAN data frame is the destination address of the A-MSDU subframe, that is, the broadcast MAC address or the multicast MAC address. The transmitter MAC address in the frame header of the fifth WLAN data frame is the MAC address of the wireless AP. If the fifth WLAN data frame carries an MSDU, the MSDU is an MSDU of the A-MSDU subframe in the A-MSDU carried by the first WLAN data frame. The MAC addresses in the frame header of the fifth WLAN data frame further include a source MAC address. The source MAC address in the frame header of the fifth WLAN data frame is the source MAC address of the A-MSDU subframe in the A-MSDU carried by the first WLAN data frame. If the fifth WLAN data frame carries an A-MSDU, one A-MSDU subframe in the A-MSDU is the A-MSDU subframe in the A-MSDU carried by the first WLAN data frame. If the fifth WLAN data frame carries an A-MSDU, the MAC addresses in the frame header of the fifth WLAN data frame further include the BSSID. The wireless AP further broadcasts or multicasts an Ethernet data frame through an Ethernet. The destination MAC address of the Ethernet data frame is the destination address of the A-MSDU subframe, that is, the broadcast MAC address or the multicast MAC address. The source MAC address of the Ethernet data frame is a MAC address corresponding to the source MAC address of the A-MSDU subframe according to the correspondence between the virtual interface MAC address of the second wireless station bridge and the MAC address of the Ethernet device connected to the second wireless station bridge. Because the source address of the A-MSDU subframe is a virtual interface MAC address corresponding to a MAC address of an Ethernet device connected to the second wireless station bridge, the source MAC address of the Ethernet data frame is a MAC address of an Ethernet device connected to the second wireless station bridge.

The first wireless station bridge receives the fifth WLAN data frame, and if the fifth WLAN data frame carries an A-MSDU, the first wireless station bridge generates an Ethernet data frame according to an A-MSDU subframe in the A-MSDU carried by the fifth WLAN data frame. A destination MAC address of the Ethernet data frame is the destination address of the A-MSDU subframe. A source MAC address of the Ethernet data frame is a MAC address corresponding to the source MAC address of the A-MSDU subframe according to the correspondence which is between the virtual interface MAC address of the second wireless station bridge and the MAC address of the Ethernet device connected to the second wireless station bridge and is broadcast by the wireless AP. Because the source address of the A-MSDU subframe is a virtual interface MAC address corresponding to a MAC address of an Ethernet device connected to the second wireless station bridge, the source MAC address of the Ethernet data frame is a MAC address of an Ethernet device connected to the second wireless station bridge.

Because the receiver MAC address in the frame header of the fifth WLAN data frame is the broadcast MAC address or the multicast MAC address, the second wireless station bridge also receives the fifth WLAN data frame. If the fifth WLAN data frame carries an MSDU, the second wireless station bridge checks the source MAC address in the frame header of the fifth WLAN data frame. If the source MAC address in the frame header of the fifth WLAN data frame is a virtual interface MAC address of the second wireless station bridge, that is, the source MAC address is one of a plurality of virtual interface MAC addresses of the second wireless station bridge, the second wireless station bridge discards the fifth WLAN data frame. If the fifth WLAN data frame carries an A-MSDU, the second wireless station bridge obtains each A-MSDU subframe in the A-MSDU carried by the fifth WLAN data frame. The second wireless station bridge checks the source address of the obtained A-MSDU subframe, and if the source address of the A-MSDU subframe is a virtual interface MAC address of the second wireless station bridge, that is, the source address is one of a plurality of virtual interface MAC addresses of the second wireless station bridge, the second wireless station bridge discards the A-MSDU subframe.

If the wireless AP receives a second Ethernet data frame from a second Ethernet device, and a destination MAC address of the second Ethernet data frame is a MAC address of a device connected to the wireless AP through the first wireless station bridge, the wireless AP generates a fourth WLAN data frame according to the second Ethernet data frame. The second Ethernet device is a device connected to the wireless AP through an Ethernet, for example, the device 118 in FIG. 1. A frame header of the fourth WLAN data frame includes a source MAC address, a transmitter MAC address and a receiver MAC address. The source MAC address in the frame header of the fourth WLAN data frame is the source MAC address of the second Ethernet data frame. The receiver MAC address in the frame header of the fourth WLAN data frame is a virtual interface MAC address which is of the first wireless station bridge and corresponds to the destination MAC address of the second Ethernet data frame according to the correspondence between the virtual interface MAC address of the first wireless station bridge and the MAC address of the Ethernet device connected to the first wireless station bridge. The transmitter MAC address in the frame header of the fourth WLAN data frame is the MAC address of the wireless AP, that is, the BSSID. The wireless AP sends the fourth wireless local area network data frame.

308: The wireless access point sends the second wireless local area network data frame.

The first wireless station bridge receives the second WLAN data frame sent by the wireless AP. If the second WLAN data frame carries an MSDU, the first wireless station generates a third Ethernet data frame according to the second WLAN data frame. A destination MAC address of the third Ethernet data frame is a MAC address corresponding to the receiver MAC address in the frame header of the second WLAN data frame according to the correspondence between the virtual interface MAC address of the first wireless station bridge and the MAC address of the Ethernet device connected to the first wireless station bridge. Because the receiver MAC address in the frame header of the second WLAN data frame is the virtual interface MAC address corresponding to the MAC address of the Ethernet device connected to the first wireless station bridge, the destination MAC address in the frame header of the second WLAN data frame is the MAC address of the Ethernet device connected to the first wireless station bridge. The source MAC address of the third Ethernet data frame is a MAC address corresponding to the source MAC address in the frame header of the second WLAN data frame according to the correspondence between the virtual interface MAC address of the second wireless station bridge and the MAC address of the Ethernet device connected to the second wireless station bridge. Because the source MAC address in the frame header of the second WLAN data frame is the transmitter MAC address in the frame header of the WLAN data frame sent by the second wireless station bridge, that is, a virtual interface MAC address corresponding to a MAC address of an Ethernet device that sends an Ethernet data frame to the second wireless station bridge, the source MAC address of the third Ethernet data frame is the MAC address of the Ethernet device that sends the Ethernet data frame to the second wireless station bridge. If the second WLAN data frame carries an A-MSDU, the first wireless station generates a third Ethernet data frame according to an A-MSDU subframe in the A-MSDU carried by the second WLAN data frame. The destination MAC address and the source MAC address of the third Ethernet data frame are respectively the destination address and the source address of the A-MSDU subframe.

The embodiment shown in FIG. 3 is described with an emphasis on the working method of the wireless access point, and for the working method of the wireless station bridge in this embodiment, refer to the embodiment shown in FIG. 2.

Figure 4:
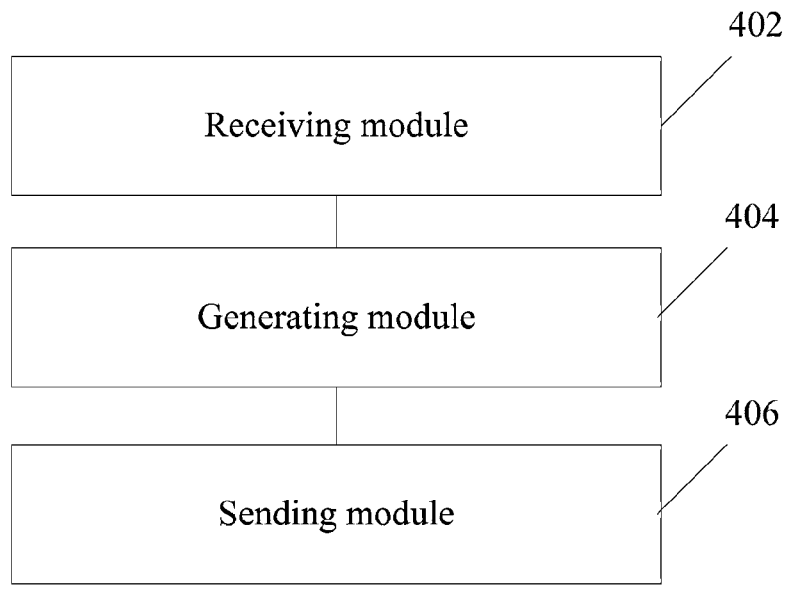
FIG. 4 is a schematic diagram of an apparatus for accessing a wireless local area network according to an embodiment of the present invention.

Referring to FIG. 1 and FIG. 4, an embodiment of the present invention provides an apparatus for accessing a wireless local area network. FIG. 4 is a schematic diagram of an apparatus for accessing a wireless local area network according to an embodiment of the present invention. The apparatus for accessing a WLAN is implemented by a wireless STA. The wireless STA implementing the apparatus for accessing a wireless local area network provides a bridging function, and therefore, may also be referred to as a wireless station bridge. The wireless station bridge may specifically be a mobile phone, various types of computers, a tablet computer, a PDA, an MID or an e-book reader. The wireless station bridge may be any wireless station bridge in FIG. 1, and for ease of description, the wireless station bridge in the following description is 104 in FIG. 1 and is referred to as a first wireless station bridge, and the apparatus for accessing a WLAN is referred to as a first apparatus for accessing a WLAN.

The apparatus for accessing a wireless local area network includes a receiving module 402, a generating module 404 and a sending module 406. Where, The receiving module 402 is configured to receive a first Ethernet data frame sent by a first Ethernet device, where a source MAC address of the first Ethernet data frame is a MAC address of a first Ethernet device connected to the first wireless station bridge.

The first Ethernet device is a device connected, through an Ethernet, to the first wireless station bridge implementing the first apparatus for accessing a WLAN, for example, 110 or 112 in FIG. 1.

One apparatus for accessing a WLAN generates a plurality of virtual interface MAC addresses. Any one of a plurality of virtual interface MAC addresses generated by one apparatus for accessing a WLAN is different from a MAC address of the apparatus for accessing a WLAN itself.

After receiving the first Ethernet data frame, the first apparatus for accessing a WLAN generates correspondence between the source MAC address of the first Ethernet data frame and one virtual interface MAC address. The virtual interface MAC address is one of a plurality of virtual interface MAC addresses generated by the first apparatus for accessing a WLAN.

For example, the first apparatus for accessing a WLAN may generate the correspondence in the following several manners.

The first apparatus for accessing a WLAN may generate a plurality of virtual interface MAC addresses immediately when it becomes associated with a wireless AP. After receiving the first Ethernet data frame, the first apparatus for accessing a WLAN selects one unused virtual interface MAC address from the plurality of virtual interface MAC addresses having already been generated, and generates correspondence between the source MAC address of the first Ethernet data frame and the unused virtual interface MAC address. The selected virtual interface MAC address becomes a used virtual interface MAC address.

Alternatively, the first apparatus for accessing a WLAN may also generate one virtual interface MAC address corresponding to the source MAC address of the first Ethernet data frame after receiving the first Ethernet data frame. The generated virtual interface MAC address is different from the virtual interface MAC addresses having already been generated by the first apparatus for accessing a WLAN. The first apparatus for accessing a WLAN generates correspondence between the source MAC address of the first Ethernet data frame and the generated virtual interface MAC address.

Alternatively, the first apparatus for accessing a WLAN may also generate a plurality of virtual interface MAC addresses immediately when it becomes associated with a wireless AP. After receiving the first Ethernet data frame, the first apparatus for accessing a WLAN newly generates a virtual interface MAC address corresponding to the source MAC address of the first Ethernet data frame if all the plurality of virtual interface MAC addresses having already been generated has been used. The newly generated virtual interface MAC address is different from the virtual interface MAC addresses having already been generated by the first apparatus for accessing a WLAN. The first apparatus for accessing a WLAN generates correspondence between the source MAC address of the first Ethernet data frame and the newly generated virtual interface MAC address.

The first apparatus for accessing a WLAN may also generate virtual interface MAC addresses in other manners, and no matter which manner is used, there is one-to-one correspondence between the plurality of used virtual interface MAC addresses of the first apparatus for accessing a WLAN and MAC addresses of a plurality of Ethernet devices having communicated with the first apparatus for accessing a WLAN. That is to say, all source MAC addresses in correspondences, which are between source MAC addresses of all Ethernet data frames and virtual interface MAC addresses and has already been generated by the first apparatus for accessing a WLAN, are bijective mapped to all the virtual interface MAC addresses in the correspondences.

One apparatus for accessing a WLAN may generate a virtual interface MAC address at random, or may generate a virtual interface MAC address according to a preset rule. For example, the apparatus for accessing a WLAN may set 24 MSBs of the generated virtual interface MAC address to a fixed value, for example, an OUI; the 24 MSBs are followed by an AID of the apparatus for accessing a WLAN on an AP, and because 2 MSBs of the AID are a fixed value, the wireless station bridge may only set 14 LSBs of the AID here. 10 LSBs of the virtual interface MAC address are reserved bits, padding or random numbers. Optionally, if after receiving an Ethernet data frame, the apparatus for accessing a WLAN newly generates a virtual interface MAC address corresponding to a source MAC address of the Ethernet data frame, the apparatus for accessing a WLAN may calculate, according to the source MAC address and by using a preset algorithm, the virtual interface MAC address to be generated.

After generating the correspondence, the first apparatus for accessing a WLAN sends the correspondence to the wireless AP associated with the first apparatus for accessing a WLAN. After receiving the correspondence, the wireless AP broadcasts the correspondence. According to the correspondence, the wireless AP or another wireless station bridge may know which Ethernet device a frame or subframe including the virtual interface MAC address is from.

The generating module 404 is configured to generate a first wireless local area network data frame (hereinafter briefly referred to as a WLAN data frame) according to the first Ethernet data frame. A frame header of the first WLAN data frame includes a transmitter MAC address and a receiver MAC address. The transmitter MAC address in the frame header of the first WLAN data frame is a virtual interface MAC address corresponding to the source MAC address of the first Ethernet data frame, and the virtual interface MAC address is one of a plurality of virtual interface MAC addresses of the first apparatus for accessing a WLAN.

A WLAN data frame is a frame for transmitting data in a wireless local area network. The WLAN data frame includes a frame header and a MSDU, or includes a frame header and an A-MSDU. The MSDU includes a part in a received Ethernet data frame other than a source MAC address and a destination MAC address. The A-MSDU aggregates a plurality of MSDUs into one WLAN data frame for transmission. Only a plurality of MSDUs having a same transmitter address and a same receiver address in a WLAN is aggregated into one A-MSDU for transmission. One A-MSDU includes a plurality of A-MSDU subframes, and each A-MSDU subframe includes an A-MSDU subframe header and an MSDU. The A-MSDU subframe header includes a source address (SA), a destination address (DA), and a length of the MSDU in the A-MSDU subframe.

The frame header of the WLAN data frame is a MAC header. The number of MAC addresses in a frame header of a WLAN data frame transmitted between a wireless STA and a wireless AP is 3. The MAC addresses in the frame header of the WLAN data frame always include a transmitter address and a receiver address, and because the transmitter address and the receiver address are MAC addresses, they are respectively referred to as a transmitter MAC address and a receiver MAC address in the following. If the WLAN data frame carries an MSDU, the MAC addresses in the frame header of the WLAN data frame further include a destination MAC address. If the WLAN data frame carries an A-MSDU, the MAC addresses in the frame header of the WLAN data frame further include a BSSID, that is, a MAC address of the wireless AP.

The first WLAN data frame is sent from the first apparatus for accessing a WLAN to the wireless AP, so the receiver MAC address in the frame header of the first WLAN data frame is the MAC address of the wireless AP.

Generally, a transmitter MAC address of a WLAN data frame sent by a wireless station is a MAC address of the wireless station. If the apparatus for accessing a WLAN uses a MAC address of the wireless station bridge itself implementing the apparatus for accessing a WLAN as a transmitter MAC address, the wireless AP receiving the WLAN data frame and the wireless station from which the WLAN data frame is forwarded by the wireless AP cannot distinguish whether a device sending the WLAN data frame is the apparatus for accessing a WLAN or is a device connected, through an Ethernet, to the wireless station bridge implementing the apparatus for accessing a WLAN. If the apparatus for accessing a WLAN uses a MAC address of a received Ethernet data frame as a transmitter MAC address of a WLAN data frame, the wireless AP cannot recognize the transmitter MAC address of the WLAN data frame.

In the embodiment of the present invention, the first apparatus for accessing a WLAN generates one virtual interface MAC address for each Ethernet device connected, through an Ethernet, to the first wireless station bridge implementing the first apparatus for accessing a WLAN, and when sending the first WLAN data frame, uses the virtual interface MAC address corresponding to the source MAC address of the first Ethernet data frame as the transmitter MAC address of the first WLAN data frame. The Ethernet device connected, through the Ethernet, to the first wireless station bridge implementing the first apparatus for accessing a WLAN may be a device directly connected to the first wireless station bridge, or may be a device connected to the first wireless station bridge through a network switch or an Ethernet hub.

If the first WLAN data frame carries an MSDU, the destination MAC address in the frame header of the first WLAN data frame is a destination MAC address of the first Ethernet data frame.

The first apparatus for accessing a WLAN may aggregate a plurality of MSDUs. The first apparatus for accessing a WLAN generates the first WLAN data frame according to the first Ethernet data frame and other Ethernet data frames, and the first WLAN data frame carries an A-MSDU. The A-MSDU includes a plurality of A-MSDU subframes, where one of the A-MSDU subframes is generated according to the first Ethernet data frame. The destination address of the A-MSDU subframe is the destination MAC address of the first Ethernet data frame. If the first Ethernet data frame is a unicast data frame, the source address of the A-MSDU subframe is the source MAC address of the first Ethernet data frame. If the first Ethernet data frame is a broadcast data frame or a multicast data frame, the destination address of the A-MSDU subframe is the destination MAC address of the first Ethernet data frame, that is, a broadcast MAC address or a multicast MAC address, and the source address of the A-MSDU subframe is the virtual interface MAC address corresponding to the source MAC address of the first Ethernet data frame. Optionally, the transmitter MAC address of the first WLAN data frame carrying the A-MSDU may be the MAC address of the first wireless station bridge instead of the virtual interface MAC address.

The sending module 406 is configured to send the first WLAN data frame.

If the wireless AP receives a WLAN data frame sent by a second wireless station bridge, where the WLAN data frame carries an MSDU, and a destination MAC address in a frame header of the WLAN data frame is a MAC address of an Ethernet device connected to the first wireless station bridge, for example, the first Ethernet device, the wireless AP sends a second WLAN data frame to the first apparatus for accessing a WLAN. A receiver MAC address in a frame header of the second WLAN data frame is a virtual interface MAC address corresponding to the destination MAC address in the frame header of the WLAN data frame sent by the second wireless station bridge, according to the correspondence which is between the source MAC address of the first Ethernet data frame and the virtual interface MAC address and is sent by the first apparatus for accessing a WLAN. A transmitter MAC address in the frame header of the second WLAN data frame is the MAC address of the wireless AP. If the second WLAN data frame carries an MSDU, the MSDU is the MSDU carried by the WLAN data frame sent by the second wireless station bridge, and the MAC addresses in the frame header of the second WLAN data frame further include a source MAC address. The source MAC address is the transmitter MAC address in the frame header of the WLAN data frame sent by the second wireless station bridge. If the second WLAN data frame carries an A-MSDU, an MSDU in one A-MSDU subframe in the A-MSDU is the MSDU carried by the WLAN data frame sent by the second wireless station bridge, the destination address of the A-MSDU subframe is the destination MAC address in the frame header of the WLAN data frame sent by the second wireless station bridge, and the source address of the A-MSDU subframe is the transmitter MAC address in the frame header of the WLAN data frame sent by the second wireless station bridge. If the second WLAN data frame carries an A-MSDU, the MAC addresses in the frame header of the second WLAN data frame further include the BSSID.

If the wireless AP receives a WLAN data frame sent by the second wireless station bridge, where the WLAN data frame carries an A-MSDU, and a destination address of one A-MSDU subframe in the A-MSDU carried by the WLAN data frame is a MAC address of an Ethernet device connected to the first wireless station bridge, for example, the first Ethernet device, the wireless AP sends a second WLAN data frame to the first apparatus for accessing a WLAN. The wireless AP receives correspondence which is between a MAC address of an Ethernet device connected to the second wireless station bridge and a virtual interface MAC address and is sent by the second wireless station bridge. A transmitter MAC address in a frame header of the second WLAN data frame is the MAC address of the wireless AP. If the second WLAN data frame carries an MSDU, the MSDU is an MSDU of an A-MSDU subframe whose destination address is a MAC address of an Ethernet device connected to the first wireless station bridge and which is in the A-MSDU carried by the WLAN data frame sent by the second wireless station bridge. A receiver MAC address in the frame header of the second WLAN data frame is a virtual interface MAC address corresponding to the destination address of the A-MSDU subframe whose destination address is a MAC address of an Ethernet device connected to the first wireless station bridge and which is in the A-MSDU carried by the WLAN data frame sent by the second wireless station bridge, according to the correspondence which is between the source MAC address of the first Ethernet data frame and the virtual interface MAC address and is sent by the first apparatus for accessing a WLAN. The MAC addresses in the frame header of the second WLAN data frame further include a source MAC address. The source MAC address in the frame header of the second WLAN data frame is the transmitter MAC address in the frame header of the WLAN data frame sent by the second wireless station bridge. Alternatively, the source MAC address in the frame header of the second WLAN data frame is a virtual interface MAC address corresponding to the source address of the A-MSDU subframe whose destination address is a MAC address of an Ethernet device connected to the first wireless station bridge and which is in the A-MSDU carried by the WLAN data frame sent by the second wireless station bridge, according to the correspondence which is between the MAC address of the Ethernet device connected to the second wireless station bridge and the virtual interface MAC address and is sent by the second wireless station bridge. If the second WLAN data frame carries an A-MSDU, one A-MSDU subframe in the A-MSDU is the A-MSDU subframe whose destination address is a MAC address of an Ethernet device connected to the first wireless station bridge and which is in the A-MSDU carried by the WLAN data frame sent by the second wireless station bridge. The receiver MAC address in the frame header of the second WLAN data frame is the MAC address of the first wireless station bridge. Alternatively, the receiver MAC address in the frame header of the second WLAN data frame is the virtual interface MAC address corresponding to the destination address of the A-MSDU subframe whose destination address is a MAC address of an Ethernet device connected to the first wireless station bridge and which is in the A-MSDU carried by the WLAN data frame sent by the second wireless station bridge, according to the correspondence which is between the source MAC address of the first Ethernet data frame and the virtual interface MAC address and is sent by the first apparatus for accessing a WLAN. The MAC addresses in the frame header of the second WLAN data frame further include the BSSID.

After receiving the correspondence which is between the MAC address of the Ethernet device connected to the second wireless station bridge and the virtual interface MAC address and is sent by the second wireless station bridge, the wireless AP broadcasts the correspondence. The first apparatus for accessing a WLAN receives the correspondence. The first apparatus for accessing a WLAN receives the second WLAN data frame sent by the wireless AP. If the second WLAN data frame carries an MSDU, the first wireless station generates a second Ethernet data frame according to the second WLAN data frame. The destination MAC address of the second Ethernet data frame is a MAC address corresponding to the receiver MAC address in the frame header of the second WLAN data frame according to the correspondence between the source MAC address of the first Ethernet data frame and the virtual interface MAC address corresponding to the source MAC address. Because the receiver MAC address in the frame header of the second WLAN data frame is the virtual interface MAC address corresponding to the MAC address of the Ethernet device connected to the first wireless station bridge, the destination MAC address in the frame header of the second WLAN data frame is the MAC address of the Ethernet device connected to the first wireless station bridge. The source MAC address of the second Ethernet data frame is a MAC address corresponding to the source MAC address in the frame header of the second WLAN data frame according to correspondence between a virtual interface MAC address of the second wireless station bridge and a MAC address of an Ethernet device connected to the second wireless station bridge. Because the source MAC address in the frame header of the second WLAN data frame is the transmitter MAC address in the frame header of the WLAN data frame sent by the second wireless station bridge, that is, a virtual interface MAC address corresponding to a MAC address of an Ethernet device that sends an Ethernet data frame to the second wireless station bridge, the source MAC address of the second Ethernet data frame is the MAC address of the Ethernet device that sends the Ethernet data frame to the second wireless station bridge. If the second WLAN data frame carries an A-MSDU, the first apparatus for accessing a WLAN generates a second Ethernet data frame according to an A-MSDU subframe in the A-MSDU carried by the second WLAN data frame. The destination MAC address and the source MAC address of the second Ethernet data frame are respectively the destination address and the source address of the A-MSDU subframe.

If the first Ethernet data frame is a broadcast data frame or a multicast data frame, in a case that the first WLAN data frame carries an MSDU, the destination MAC address in the frame header of the first WLAN data frame is the destination MAC address of the first Ethernet data frame, that is, the broadcast MAC address or the multicast MAC address. After receiving the first WLAN data frame, the wireless AP sends a third WLAN data frame. A receiver MAC address in a frame header of the third WLAN data frame is the destination MAC address in the frame header of the first WLAN data frame, that is, the broadcast MAC address or the multicast MAC address. A transmitter MAC address in the frame header of the third WLAN data frame is the MAC address of the wireless AP. If the third WLAN data frame carries an MSDU, the MSDU is the MSDU carried by the first WLAN data frame, and the MAC addresses in the frame header of the third WLAN data frame further include a source MAC address. The source MAC address is the transmitter MAC address in the frame header of the first WLAN data frame. If the third WLAN data frame carries an A-MSDU, an MSDU in one A-MSDU subframe in the A-MSDU is the MSDU carried by the first WLAN data frame, the destination address of the A-MSDU subframe is the destination MAC address in the frame header of the first WLAN data frame, that is, the broadcast MAC address or the multicast MAC address, and the source address of the A-MSDU subframe is the transmitter MAC address in the frame header of the first WLAN data frame. If the third WLAN data frame carries an A-MSDU, the MAC addresses in the frame header of the third WLAN data frame further include the BSSID.

If the first Ethernet data frame is a broadcast data frame or a multicast data frame, in a case that the first WLAN data frame carries an A-MSDU, the destination address of the A-MSDU subframe which corresponds to the first Ethernet data frame and is in the A-MSDU carried by the first WLAN data frame is the destination MAC address of the first Ethernet data frame, that is, the broadcast MAC address or the multicast MAC address, and the source address of the A-MSDU subframe is the virtual interface MAC address corresponding to the source MAC address of the first Ethernet data frame. After receiving the first WLAN data frame, the wireless AP sends a third WLAN data frame. A receiver MAC address in a frame header of the third WLAN data frame is the destination address of the A-MSDU subframe, that is, the broadcast MAC address or the multicast MAC address. A transmitter MAC address in the frame header of the third WLAN data frame is the MAC address of the wireless AP. If the third WLAN data frame carries an MSDU, the MSDU is an MSDU in an A-MSDU subframe which corresponds to the first Ethernet data frame and is in the A-MSDU carried by the first WLAN data frame. The MAC addresses in the frame header of the third WLAN data frame further include a source MAC address. The source MAC address in the frame header of the third WLAN data frame is the source MAC address of the A-MSDU subframe which corresponds to the first Ethernet data frame and is in the A-MSDU carried by the first WLAN data frame. If the third WLAN data frame carries an A-MSDU, one A-MSDU subframe in the A-MSDU is the A-MSDU subframe which corresponds to the first Ethernet data frame and is in the A-MSDU carried by the first WLAN data frame. If the third WLAN data frame carries an A-MSDU, the MAC addresses in the frame header of the third WLAN data frame further include the BSSID.

The second wireless station bridge receives the third WLAN data frame, and if the third WLAN data frame carries an A-MSDU, the second wireless station bridge generates a second Ethernet data frame according to an A-MSDU subframe in the A-MSDU carried by the third WLAN data frame. The destination MAC address of the second Ethernet data frame is the destination address of the A-MSDU subframe. The source MAC address of the second Ethernet data frame is a MAC address corresponding to the source MAC address of the A-MSDU subframe according to the correspondence which is between the source MAC address of the first Ethernet data frame and the virtual interface MAC address corresponding to the source MAC address and is broadcast by the wireless AP. Because the source address of the A-MSDU subframe is the virtual interface MAC address corresponding to the source MAC address of the first Ethernet data frame, the source MAC address of the second Ethernet data frame is the MAC address of the first Ethernet device.

Because a receiver MAC address in a frame header of a fifth WLAN data frame is the broadcast MAC address or the multicast MAC address, the first apparatus for accessing a WLAN also receives the fifth WLAN data frame. If the fifth WLAN data frame carries an MSDU, the first apparatus for accessing a WLAN checks a source MAC address in the frame header of the fifth WLAN data frame. If the source MAC address in the frame header of the fifth WLAN data frame is a virtual interface MAC address of the first apparatus for accessing a WLAN, that is, the source MAC address is one of a plurality of virtual interface MAC addresses of the first apparatus for accessing a WLAN, the first apparatus for accessing a WLAN discards the fifth WLAN data frame. If the fifth WLAN data frame carries an A-MSDU, the first apparatus for accessing a WLAN obtains each A-MSDU subframe in the A-MSDU carried by the fifth WLAN data frame. The first apparatus for accessing a WLAN checks the source address of the obtained A-MSDU subframe, and if the source address of the A-MSDU subframe is a virtual interface MAC address of the first apparatus for accessing a WLAN, that is, the source address is one of a plurality of virtual interface MAC addresses of the first apparatus for accessing a WLAN, the first apparatus for accessing a WLAN discards the A-MSDU subframe.

Figure 5:
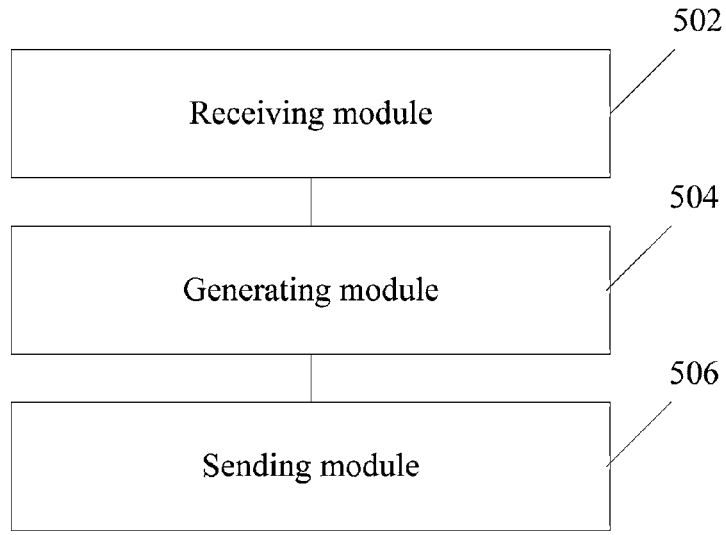
FIG. 5 is a schematic diagram of another apparatus for accessing a wireless local area network according to an embodiment of the present invention.

Referring to FIG. 1 and FIG. 5, an embodiment of the present invention provides another apparatus for accessing a wireless local area network. FIG. 5 is a schematic diagram of another apparatus for accessing a wireless local area network according to an embodiment of the present invention. The another apparatus for accessing a WLAN is implemented by a wireless STA. The wireless AP may specifically be a wireless router. The wireless AP may be 102 in FIG. 1.

The another apparatus for accessing a WLAN includes a receiving module 502, a generating module 504 and a sending module 506. Where, The receiving module 502 is configured to receive correspondence which is between a virtual interface MAC address of a first wireless station bridge and a MAC address of an Ethernet device connected to the first wireless station bridge and is from the first wireless station bridge.

The first wireless station bridge in the embodiment of the present invention may be any wireless station bridge, and for ease of description, the first wireless station bridge in the following description is 104 in FIG. 1.

One wireless station bridge generates a plurality of virtual interface MAC addresses. Any one of a plurality of virtual interface MAC addresses generated by one wireless station bridge is different from a MAC address of the wireless station bridge itself. Any one of a plurality of virtual interface MAC addresses generated by one wireless station bridge is different from a MAC address of an Ethernet device connected to the wireless station bridge.

After receiving an Ethernet data frame, the first wireless station bridge generates correspondence between a source MAC address of the Ethernet data frame and one virtual interface MAC address. The virtual interface MAC address is one of a plurality of virtual interface MAC addresses generated by the first wireless station bridge.

For example, the first wireless station bridge may generate the correspondence in the following several manners.

The first wireless station bridge may generate a plurality of virtual interface MAC addresses immediately when it becomes associated with another apparatus for accessing a WLAN. After receiving the Ethernet data frame, the first wireless station bridge selects one unused virtual interface MAC address from the plurality of virtual interface MAC addresses having already been generated, and generates correspondence between the source MAC address of the Ethernet data frame and the unused virtual interface MAC address. The selected virtual interface MAC address becomes a used virtual interface MAC address.

Alternatively, the first wireless station bridge may also generate one virtual interface MAC address corresponding to the source MAC address of the Ethernet data frame after receiving the Ethernet data frame. The generated virtual interface MAC address is different from the virtual interface MAC addresses having already been generated by the first wireless station bridge. The first wireless station bridge generates correspondence between the source MAC address of the Ethernet data frame and the generated virtual interface MAC address.

Alternatively, the first wireless station bridge may generate a plurality of virtual interface MAC addresses immediately when it becomes associated with another apparatus for accessing a WLAN. After receiving the Ethernet data frame, the first wireless station bridge newly generates a virtual interface MAC address corresponding to the source MAC address of the Ethernet data frame if all the plurality of virtual interface MAC addresses having already been generated has been used. The newly generated virtual interface MAC address is different from the virtual interface MAC addresses having already been generated by the first wireless station bridge. The first wireless station bridge generates correspondence between the source MAC address of the Ethernet data frame and the newly generated virtual interface MAC address.

The first wireless station bridge may also generate virtual interface MAC addresses in other manners, and no matter which manner is used, there is one-to-one correspondence between the plurality of used virtual interface MAC addresses of the first wireless station bridge and MAC addresses of a plurality of Ethernet devices having communicated with the first wireless station bridge. That is to say, all source MAC addresses in correspondences, which are between source MAC addresses of all Ethernet data frames and virtual interface MAC addresses and has already been generated by the first wireless station bridge, are bijective mapped to all the virtual interface MAC addresses in the correspondences.

One wireless station bridge may generate a virtual interface MAC address at random, or may generate a virtual interface MAC address according to a preset rule. For example, the wireless station bridge may set 24 MSBs of the generated virtual interface MAC address to a fixed value, for example, an OUI; the 24 MSBs are followed by an AID of the wireless station bridge on an AP, and because 2 MSBs of the AID are a fixed value, the wireless station bridge may only set 14 LSBs of the AID here. 10 LSBs of the virtual interface MAC address are reserved bits, padding or random numbers. Optionally, if after receiving an Ethernet data frame, the wireless station bridge newly generates a virtual interface MAC address corresponding to a source MAC address of the Ethernet data frame, the wireless station bridge may calculate, according to the source MAC address and by using a preset algorithm, the virtual interface MAC address to be generated.

After generating the correspondence, the first wireless station bridge sends the correspondence to the another apparatus for accessing a WLAN associated with the first wireless station bridge. After a receiving module 502 of the another apparatus for accessing a WLAN receives the correspondence, a sending module 506 of the another apparatus for accessing a WLAN broadcasts the correspondence.

The receiving module 502 of the another apparatus for accessing a WLAN may also receive correspondence which is between a virtual interface MAC address of a second wireless station bridge and a MAC address of an Ethernet device connected to the second wireless station bridge and is from the second wireless station bridge. After the receiving module 502 of the another apparatus for accessing a WLAN receives the correspondence, the sending module 506 broadcasts the correspondence. The first wireless station bridge receives the correspondence.

The receiving module 502 is further configured to receive a first wireless local area network data frame from the second wireless station bridge. A frame header of the first wireless local area network data frame includes a transmitter MAC address and a receiver MAC address.

The second wireless station bridge receives an Ethernet data frame sent by an Ethernet device, where a source MAC address of the Ethernet data frame is a MAC address of an Ethernet device connected to the second wireless station bridge. The second wireless station bridge generates a first WLAN data frame according to the Ethernet data frame. A transmitter MAC address in a frame header of the first WLAN data frame is a virtual interface MAC address corresponding to the source MAC address of the Ethernet data frame, and the virtual interface MAC address is one of a plurality of virtual interface MAC addresses of the second wireless station bridge. Alternatively, in a case that the first WLAN data frame carries an A-MSDU and a source address of an A-MSDU subframe in the A-MSDU is the virtual interface MAC address corresponding to the source MAC address of the Ethernet data frame, the transmitter MAC address in the frame header of the first WLAN data frame may be a MAC address of the second wireless station bridge.

A WLAN data frame is a frame for transmitting data in a WLAN. The WLAN data frame includes a frame header and an MSDU, or includes a frame header and an A-MSDU. One A-MSDU includes a plurality of A-MSDU subframes, and each A-MSDU subframe includes an A-MSDU subframe header and an MSDU. The A-MSDU subframe header includes a source address, a destination address, and a length of the MSDU in the A-MSDU subframe.

The frame header of the WLAN data frame is a MAC header. The number of MAC addresses in a frame header of a WLAN data frame transmitted between a wireless STA and a wireless AP is 3.

The generating module 504 is configured to, in a case that a destination device of the first wireless local area network data frame is a device connected to the first wireless station bridge, generate a second wireless local area network data frame according to the first wireless local area network data frame. A frame header of the second wireless local area network data frame includes a transmitter MAC address and a receiver MAC address. The receiver MAC address in the frame header of the second wireless local area network data frame is a virtual interface MAC address corresponding to a MAC address of the destination device of the first wireless local area network data frame according to the correspondence between the virtual interface MAC address of the first wireless station bridge and the MAC address of the Ethernet device connected to the first wireless station bridge.

The transmitter MAC address in the frame header of the second WLAN data frame is a MAC address of a wireless AP implementing the another apparatus for accessing a WLAN.

(1) If the first WLAN data frame carries an MSDU, the frame header of the first WLAN data frame includes a destination MAC address. The destination MAC address is the MAC address of the destination device. The destination device of the first WLAN data frame is a device connected to the first wireless station bridge, that is, the destination MAC address in the frame header of the first WLAN data frame is a MAC address of a device connected to the first wireless station bridge.

If the second WLAN data frame carries an MSDU, the MSDU is the MSDU carried by the WLAN data frame sent by the second wireless station bridge, and the MAC addresses in the frame header of the second WLAN data frame further include a source MAC address. The source MAC address is the transmitter MAC address in the frame header of the first WLAN data frame.

If the second WLAN data frame carries an A-MSDU, an MSDU in one A-MSDU subframe in the A-MSDU is the MSDU carried by the first WLAN data frame, the destination address of the A-MSDU subframe is the destination MAC address in the frame header of the first WLAN data frame, and the source address of the A-MSDU subframe is the transmitter MAC address in the frame header of the first WLAN data frame. The MAC addresses in the frame header of the second WLAN data frame further include the BSSID. In this case, alternatively, the receiver MAC address in the frame header of the second wireless local area network data frame may be the MAC address of the second wireless station bridge.

If a destination device of a WLAN data frame received by the another apparatus for accessing a WLAN from the second wireless station bridge, for example, a third WLAN data frame, is a device connected, through an Ethernet, to the wireless AP implementing the another apparatus for accessing a WLAN, for example, the device 118 in FIG. 1, the generating module 504 is further configured to generate the first Ethernet data frame according to the third WLAN data frame. If the third WLAN data frame carries an MSDU, a frame header of the third WLAN data frame includes a destination MAC address, a transmitter MAC address and a receiver MAC address. The destination device of the third WLAN data frame is a device connected to the wireless AP through an Ethernet, that is, a destination MAC address in the frame header of the third WLAN data frame is a MAC address of a device connected to the wireless AP through an Ethernet. The destination MAC address of the first Ethernet data frame is the destination MAC address in the frame header of the third WLAN data frame. The source MAC address of the first Ethernet data frame is a MAC address corresponding to a transmitter MAC address in the frame header of the third WLAN data frame according to the correspondence between the virtual interface MAC address of the second wireless station bridge and the MAC address of the Ethernet device connected to the second wireless station bridge. Because the transmitter MAC address in the frame header of the third WLAN data frame is a virtual interface MAC address corresponding to a MAC address of an Ethernet device that sends an Ethernet data frame to the second wireless station bridge, the source MAC address of the first Ethernet data frame is the MAC address of the Ethernet device that sends the Ethernet data frame to the second wireless station bridge. If the third WLAN data frame carries an A-MSDU, the frame header of the third WLAN data frame includes the BSSID, a transmitter MAC address and a receiver MAC address. The destination device of the third WLAN data frame is a device connected to the wireless AP through an Ethernet, that is, a destination address of any one of a plurality of A-MSDU subframes in the A-MSDU carried by the third WLAN data frame is a MAC address of a device connected to the wireless AP through an Ethernet. Specifically, the generating module 504 generates the first Ethernet data frame according to an A-MSDU subframe whose destination address is a MAC address of a device connected to the wireless AP through an Ethernet and which is in the third WLAN data frame. The destination MAC address of the first Ethernet data frame is the destination address of the A-MSDU subframe. The source MAC address of the first Ethernet data frame is the source address of the A-MSDU subframe.

If the destination MAC address in the frame header of the first WLAN data frame is a broadcast MAC address or a multicast MAC address, the sending module 506 sends a fifth WLAN data frame after the receiving module 502 receives the first WLAN data frame. A receiver MAC address in a frame header of the fifth WLAN data frame is the destination MAC address in the frame header of the first WLAN data frame, that is, the broadcast MAC address or the multicast MAC address. A transmitter MAC address in the frame header of the fifth WLAN data frame is the MAC address of the wireless AP. If the fifth WLAN data frame carries an MSDU, the MSDU is the MSDU carried by the first WLAN data frame, and the MAC addresses in the frame header of the fifth WLAN data frame further include a source MAC address. The source MAC address is the transmitter MAC address in the frame header of the first WLAN data frame. If the fifth WLAN data frame carries an A-MSDU, an MSDU in one A-MSDU subframe in the A-MSDU is the MSDU carried by the first WLAN data frame, the destination address of the A-MSDU subframe is the destination MAC address in the frame header of the first WLAN data frame, that is, the broadcast MAC address or the multicast MAC address, and the source address of the A-MSDU subframe is the transmitter MAC address in the frame header of the first WLAN data frame. The MAC addresses in the frame header of the fifth WLAN data frame further include the BSSID.

(2) If the first WLAN data frame carries an A-MSDU, the A-MSDU carried by the first WLAN data frame includes a plurality of A-MSDU subframes. Destination addresses of the plurality of A-MSDU subframes are the MAC addresses of the destination devices. The destination device of the first WLAN data frame is a device connected to the first wireless station bridge, that is, a destination address of any one of a plurality of A-MSDU subframes in the A-MSDU carried by the first WLAN data frame is a MAC address of a device connected to the first wireless station bridge.

The transmitter MAC address in the frame header of the second WLAN data frame is the MAC address of the wireless AP.

If the second WLAN data frame carries an MSDU, the MSDU is an MSDU of an A-MSDU subframe whose destination address is a MAC address of an Ethernet device connected to the first wireless station bridge and which is in the A-MSDU carried by the first WLAN data frame. The receiver MAC address in the frame header of the second WLAN data frame is a virtual interface MAC address corresponding to the destination address of the A-MSDU subframe whose destination address is a MAC address of an Ethernet device connected to the first wireless station bridge and which is in the A-MSDU carried by the first WLAN data frame, according to the correspondence which is between the virtual interface MAC address of the first wireless station bridge and the MAC address of the Ethernet device connected to the first wireless station bridge and is sent by the first wireless station bridge. The MAC addresses in the frame header of the second WLAN data frame further include a source MAC address. The source MAC address in the frame header of the second WLAN data frame is a virtual interface MAC address corresponding to the source address of the A-MSDU subframe whose destination address is a MAC address of an Ethernet device connected to the first wireless station bridge and which is in the A-MSDU carried by the first WLAN data frame, according to the correspondence which is between the MAC address of the Ethernet device connected to the second wireless station bridge and the virtual interface MAC address and is sent by the second wireless station bridge. Alternatively, if the transmitter MAC address in the frame header of the first WLAN data frame is a virtual interface MAC address corresponding to the source MAC address of the Ethernet data frame received by the second wireless station bridge, the source MAC address in the frame header of the second WLAN data frame may be the transmitter MAC address in the frame header of the first WLAN data frame.

If the second WLAN data frame carries an A-MSDU, one A-MSDU subframe in the A-MSDU is the A-MSDU subframe whose destination address is a MAC address of an Ethernet device connected to the first wireless station bridge and which is in the A-MSDU carried by the first WLAN data frame. The receiver MAC address in the frame header of the second WLAN data frame is the MAC address of the first wireless station bridge. Alternatively, the receiver MAC address in the frame header of the second WLAN data frame is the virtual interface MAC address corresponding to the destination address of the A-MSDU subframe whose destination address is a MAC address of an Ethernet device connected to the first wireless station bridge and which is in the A-MSDU carried by the first WLAN data frame, according to the correspondence which is between the virtual interface MAC address of the first wireless station bridge and the MAC address of the Ethernet device connected to the first wireless station bridge and is sent by the first wireless station bridge. The MAC addresses in the frame header of the second WLAN data frame further include the BSSID.

If a destination address of one A-MSDU subframe in the A-MSDU carried by the first WLAN data frame is a broadcast MAC address or a multicast MAC address, the sending module 506 sends a fifth WLAN data frame after the receiving module 502 receives the first WLAN data frame. A receiver MAC address in a frame header of the fifth WLAN data frame is the destination address of the A-MSDU subframe, that is, the broadcast MAC address or the multicast MAC address. A transmitter MAC address in the frame header of the fifth WLAN data frame is the MAC address of the wireless AP. If the fifth WLAN data frame carries an MSDU, the MSDU is an MSDU of the A-MSDU subframe in the A-MSDU carried by the first WLAN data frame. The MAC addresses in the frame header of the fifth WLAN data frame further include a source MAC address. The source MAC address in the frame header of the fifth WLAN data frame is the source MAC address of the A-MSDU subframe in the A-MSDU carried by the first WLAN data frame. If the fifth WLAN data frame carries an A-MSDU, one A-MSDU subframe in the A-MSDU is the A-MSDU subframe in the A-MSDU carried by the first WLAN data frame. If the fifth WLAN data frame carries an A-MSDU, the MAC addresses in the frame header of the fifth WLAN data frame further include the BSSID. The sending module 506 further broadcasts or multicasts an Ethernet data frame through an Ethernet. The destination MAC address of the Ethernet data frame is the destination address of the A-MSDU subframe, that is, the broadcast MAC address or the multicast MAC address. The source MAC address of the Ethernet data frame is a MAC address corresponding to the source MAC address of the A-MSDU subframe according to the correspondence between the virtual interface MAC address of the second wireless station bridge and the MAC address of the Ethernet device connected to the second wireless station bridge. Because the source address of the A-MSDU subframe is a virtual interface MAC address corresponding to a MAC address of an Ethernet device connected to the second wireless station bridge, the source MAC address of the Ethernet data frame is a MAC address of an Ethernet device connected to the second wireless station bridge.

The first wireless station bridge receives the fifth WLAN data frame, and if the fifth WLAN data frame carries an A-MSDU, the first wireless station bridge generates an Ethernet data frame according to an A-MSDU subframe in the A-MSDU carried by the fifth WLAN data frame. A destination MAC address of the Ethernet data frame is a destination address of the A-MSDU subframe. A source MAC address of the Ethernet data frame is a MAC address corresponding to the source MAC address of the A-MSDU subframe according to the correspondence which is between the virtual interface MAC address of the second wireless station bridge and the MAC address of the Ethernet device connected to the second wireless station bridge and is broadcast by the sending module 506 of the another apparatus for accessing a WLAN. Because the source address of the A-MSDU subframe is a virtual interface MAC address corresponding to a MAC address of an Ethernet device connected to the second wireless station bridge, the source MAC address of the Ethernet data frame is a MAC address of an Ethernet device connected to the second wireless station bridge.

Because the receiver MAC address in the frame header of the fifth WLAN data frame is the broadcast MAC address or the multicast MAC address, the second wireless station bridge also receives the fifth WLAN data frame. If the fifth WLAN data frame carries an MSDU, the second wireless station bridge checks the source MAC address in the frame header of the fifth WLAN data frame. If the source MAC address in the frame header of the fifth WLAN data frame is a virtual interface MAC address of the second wireless station bridge, that is, the source MAC address is one of a plurality of virtual interface MAC addresses of the second wireless station bridge, the second wireless station bridge discards the fifth WLAN data frame. If the fifth WLAN data frame carries an A-MSDU, the second wireless station bridge obtains each A-MSDU subframe in the A-MSDU carried by the fifth WLAN data frame. The second wireless station bridge checks the source address of the obtained A-MSDU subframe, and if the source address of the A-MSDU subframe is a virtual interface MAC address of the second wireless station bridge, that is, the source address is one of a plurality of virtual interface MAC addresses of the second wireless station bridge, the second wireless station bridge discards the A-MSDU subframe.

If the receiving module 502 receives a second Ethernet data frame from a second Ethernet device, and a destination MAC address of the second Ethernet data frame is a MAC address of a device connected to the first wireless station bridge, the generating module 504 generates a fourth WLAN data frame according to the second Ethernet data frame. The second Ethernet device is a device connected to the wireless AP through an Ethernet, for example, the device 118 in FIG. 1. A frame header of the fourth WLAN data frame includes a source MAC address, a transmitter MAC address and a receiver MAC address. The source MAC address in the frame header of the fourth WLAN data frame is the source MAC address of the second Ethernet data frame. The receiver MAC address in the frame header of the fourth WLAN data frame is a virtual interface MAC address which is of the first wireless station bridge and corresponds to the destination MAC address of the second Ethernet data frame according to the correspondence between the virtual interface MAC address of the first wireless station bridge and the MAC address of the Ethernet device connected to the first wireless station bridge. The transmitter MAC address in the frame header of the fourth WLAN data frame is the MAC address of the wireless AP, that is, the BSSID. The sending module 506 sends the fourth wireless local area network data frame.

The sending module 506 is configured to send the second wireless local area network data frame.

The first wireless station bridge receives a second WLAN data frame sent by the sending module 506 of the another apparatus for accessing a WLAN. If the second WLAN data frame carries an MSDU, the first wireless station generates a third Ethernet data frame according to the second WLAN data frame. A destination MAC address of the third Ethernet data frame is a MAC address corresponding to a receiver MAC address in a frame header of the second WLAN data frame according to the correspondence between the virtual interface MAC address of the first wireless station bridge and the MAC address of the Ethernet device connected to the first wireless station bridge. Because the receiver MAC address in the frame header of the second WLAN data frame is the virtual interface MAC address corresponding to the MAC address of the Ethernet device connected to the first wireless station bridge, a destination MAC address in the frame header of the second WLAN data frame is the MAC address of the Ethernet device connected to the first wireless station bridge. A source MAC address of the third Ethernet data frame is a MAC address corresponding to the source MAC address in the frame header of the second WLAN data frame according to the correspondence between the virtual interface MAC address of the second wireless station bridge and the MAC address of the Ethernet device connected to the second wireless station bridge. Because the source MAC address in the frame header of the second WLAN data frame is the transmitter MAC address in the frame header of the WLAN data frame sent by the second wireless station bridge, that is, a virtual interface MAC address corresponding to a MAC address of an Ethernet device that sends an Ethernet data frame to the second wireless station bridge, the source MAC address of the third Ethernet data frame is the MAC address of the Ethernet device that sends the Ethernet data frame to the second wireless station bridge. If the second WLAN data frame carries an A-MSDU, the first wireless station bridge generates a third Ethernet data frame according to an A-MSDU subframe in the A-MSDU carried by the second WLAN data frame. The destination MAC address and the source MAC address of the third Ethernet data frame are respectively the destination address and the source address of the A-MSDU subframe.

In the preceding apparatus embodiments, the included modules are merely divided by functional logic, but are not limited to the preceding dividing provided that the corresponding functions can be implemented; in addition, the specific names of various modules are merely for convenience of distinguishing, but are not intended to limit the protection scope of the present invention.

Figure 6:
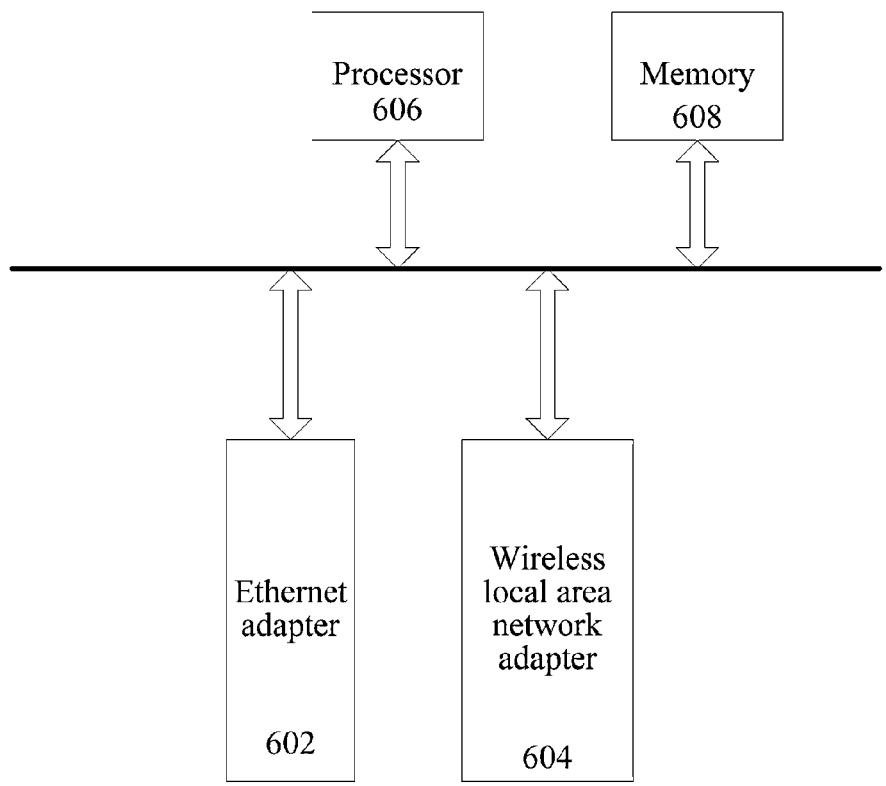
FIG. 6 is a schematic structural diagram of a wireless station according to an embodiment of the present invention.

Referring to FIG. 1 and FIG. 6, an embodiment of the present invention provides a wireless station. FIG. 6 is a schematic structural diagram of a wireless station according to an embodiment of the present invention. The wireless station provides a bridging function, and therefore, may also be referred to as a wireless station bridge. The wireless station bridge may be any wireless station bridge in FIG. 1, and for ease of description, the wireless station bridge in the following description is 104 in FIG. 1. The wireless station bridge may specifically be a mobile phone, various types of computers, a tablet computer, a PDA, an MID or an e-book reader.

The wireless station bridge includes an Ethernet adapter 602, a wireless local area network adapter 604, a processor 606 and a memory 608. The Ethernet adapter 602 is a network interface controller (MC) configured to provide an Ethernet interface. The wireless local area network adapter 604 is a wireless network interface controller (WNIC) configured to provide a wireless local area network interface. The processor 606 may be a central processing unit (CPU). The memory 608 may be a volatile memory such as a random-access memory (RAM), or a non-volatile memory such as a read-only memory (ROM), a flash memory, a hard disk drive (HDD) or a solid-state drive (SSD). The Ethernet adapter 602, the wireless local area network adapter 604 and the memory 608 are connected to the processor 606. A bold line in FIG. 6 represents a bus. The processor 606 executes a part of the operational steps in the embodiment shown in FIG. 2 according to program instructions stored in the memory 608.

The Ethernet adapter 602 receives a first Ethernet data frame sent by a first Ethernet device, where a source MAC address of the first Ethernet data frame is a MAC address of a first Ethernet device connected to a first wireless station bridge.

The first Ethernet device is a device connected to the first wireless station bridge through an Ethernet, for example, 110 or 112 in FIG. 1.

The processor 606 generates a first wireless local area network data frame (hereinafter briefly referred to as a WLAN data frame) according to the first Ethernet data frame. A frame header of the first WLAN data frame includes a transmitter MAC address and a receiver MAC address. The transmitter MAC address in the frame header of the first WLAN data frame is a virtual interface MAC address corresponding to the source MAC address of the first Ethernet data frame, and the virtual interface MAC address is one of a plurality of virtual interface MAC addresses of the first wireless station bridge.

A processor of a wireless station bridge generates a plurality of virtual interface MAC addresses for the wireless station bridge. Any one of the plurality of generated virtual interface MAC addresses is different from a MAC address of the wireless station bridge itself.

After the Ethernet adapter 602 receives the first Ethernet data frame, the processor 606 obtains the first Ethernet data frame. The processor 606 generates correspondence between the source MAC address of the first Ethernet data frame and one virtual interface MAC address. The virtual interface MAC address is one of a plurality of virtual interface MAC addresses generated by the processor 606.

For example, the processor 606 may generate the correspondence in the following several manners.

The processor 606 may generate a plurality of virtual interface MAC addresses immediately when the first wireless station bridge becomes associated with a wireless AP. After receiving the first Ethernet data frame, the processor 606 selects one unused virtual interface MAC address from the plurality of virtual interface MAC addresses having already been generated, and generates correspondence between the source MAC address of the first Ethernet data frame and the unused virtual interface MAC address. The selected virtual interface MAC address becomes a used virtual interface MAC address.

Alternatively, the processor 606 may also generate one virtual interface MAC address corresponding to the source MAC address of the first Ethernet data frame after receiving the first Ethernet data frame. The generated virtual interface MAC address is different from the virtual interface MAC addresses having already been generated by the processor 606. The processor 606 generates correspondence between the source MAC address of the first Ethernet data frame and the generated virtual interface MAC address.

Alternatively, the processor 606 may also generate a plurality of virtual interface MAC addresses immediately when the first wireless station bridge becomes associated with a wireless AP. After receiving the first Ethernet data frame, the processor 606 newly generates a virtual interface MAC address corresponding to the source MAC address of the first Ethernet data frame if all the plurality of virtual interface MAC addresses having already been generated has been used. The newly generated virtual interface MAC address is different from the virtual interface MAC addresses having already been generated by the processor 606. The processor 606 generates correspondence between the source MAC address of the first Ethernet data frame and the newly generated virtual interface MAC address.

The processor 606 may also generate virtual interface MAC addresses in other manners, and no matter which manner is used, there is one-to-one correspondence between the plurality of used virtual interface MAC addresses of the first wireless station bridge and MAC addresses of a plurality of Ethernet devices having communicated with the first wireless station bridge. That is to say, all source MAC addresses in correspondences, which are between source MAC addresses of all Ethernet data frames and virtual interface MAC addresses and has already been generated by the processor 606 are bijective mapped to all the virtual interface MAC addresses in the correspondences.

The processor 606 may generate a virtual interface MAC address at random, or may generate a virtual interface MAC address according to a preset rule. For example, the processor 606 may set 24 MSBs of the generated virtual interface MAC address to a fixed value, for example, an OUI; the 24 MSBs are followed by an AID of the wireless station bridge on an AP, and because 2 MSBs of the AID are a fixed value, the wireless station bridge may only set 14 LSBs of the AID here. 10 LSBs of the virtual interface MAC address are reserved bits, padding or random numbers. Optionally, if after the wireless station bridge receives an Ethernet data frame, the processor 606 newly generates a virtual interface MAC address corresponding to a source MAC address of the Ethernet data frame, the processor 606 may calculate, according to the source MAC address and by using a preset algorithm, the virtual interface MAC address to be generated.

After generating the correspondence, the processor 606 sends the correspondence to the wireless AP associated with the first wireless station bridge. After receiving the correspondence, the wireless AP broadcasts the correspondence. According to the correspondence, the wireless AP or another wireless station bridge may know which Ethernet device a frame or subframe including the virtual interface MAC address is from.

A WLAN data frame is a frame for transmitting data in a wireless local area network. The WLAN data frame includes a frame header and a MSDU, or includes a frame header and an A-MSDU. The MSDU includes a part in a received Ethernet data frame other than a source MAC address and a destination MAC address. The A-MSDU aggregates a plurality of MSDUs into one WLAN data frame for transmission. Only a plurality of MSDUs having a same transmitter address and a same receiver address in a WLAN is aggregated into one A-MSDU for transmission. One A-MSDU includes a plurality of A-MSDU subframes, and each A-MSDU subframe includes an A-MSDU subframe header and an MSDU. The A-MSDU subframe header includes a source address (SA), a destination address (DA), and a length of the MSDU in the A-MSDU subframe.

The frame header of the WLAN data frame is a MAC header. The number of MAC addresses in a frame header of a WLAN data frame transmitted between a wireless STA and a wireless AP is 3. The MAC addresses in the frame header of the WLAN data frame always include a transmitter address and a receiver address, and because the transmitter address and the receiver address are MAC addresses, they are respectively referred to as a transmitter MAC address and a receiver MAC address in the following. If the WLAN data frame carries an MSDU, the MAC addresses in the frame header of the WLAN data frame further include a destination MAC address. If the WLAN data frame carries an A-MSDU, the MAC addresses in the frame header of the WLAN data frame further include a BSSID, that is, a MAC address of the wireless AP.

The first WLAN data frame is sent by the first wireless station bridge to the wireless AP, so the receiver MAC address in the frame header of the first WLAN data frame is the MAC address of the wireless AP.

Generally, a transmitter MAC address of a WLAN data frame sent by a wireless station is a MAC address of the wireless station. If a wireless station bridge uses a MAC address of the wireless station bridge itself as a transmitter MAC address, the wireless AP receiving the WLAN data frame and the wireless station from which the WLAN data frame is forwarded by the wireless AP cannot distinguish whether a device sending the WLAN data frame is the wireless station bridge itself or is a device connected to the wireless station bridge through an Ethernet. If a wireless station bridge uses a MAC address of a received Ethernet data frame as a transmitter MAC address of a WLAN data frame, the wireless AP cannot recognize the transmitter MAC address of the WLAN data frame.

In the embodiment of the present invention, the processor 606 generates one virtual interface MAC address for each Ethernet device connected to the first wireless station bridge through an Ethernet, and when sending the first WLAN data frame, uses the virtual interface MAC address corresponding to the source MAC address of the first Ethernet data frame as the transmitter MAC address of the first WLAN data frame. The Ethernet device connected to the first wireless station bridge through the Ethernet may be a device directly connected to the first wireless station bridge, or may be a device connected to the first wireless station bridge through a network switch or an Ethernet hub.

If the first WLAN data frame carries an MSDU, the destination MAC address in the frame header of the first WLAN data frame is a destination MAC address of the first Ethernet data frame.

The processor 606 may aggregate a plurality of MSDUs. The processor 606 generates the first WLAN data frame according to the first Ethernet data frame and other Ethernet data frames, and the first WLAN data frame carries an A-MSDU. The A-MSDU includes a plurality of A-MSDU subframes, where one of the A-MSDU subframes is generated according to the first Ethernet data frame. A destination address of the A-MSDU subframe is the destination MAC address of the first Ethernet data frame. If the first Ethernet data frame is a unicast data frame, a source address of the A-MSDU subframe is the source MAC address of the first Ethernet data frame. If the first Ethernet data frame is a broadcast data frame or a multicast data frame, the destination address of the A-MSDU subframe is the destination MAC address of the first Ethernet data frame, that is, a broadcast MAC address or a multicast MAC address, and the source address of the A-MSDU subframe is the virtual interface MAC address corresponding to the source MAC address of the first Ethernet data frame. Optionally, the transmitter MAC address of the first WLAN data frame carrying the A-MSDU may be the MAC address of the first wireless station bridge instead of the virtual interface MAC address.

After the processor 606 generates the first WLAN data frame, the wireless local area network adapter 604 sends the first WLAN data frame.

Figure 7:
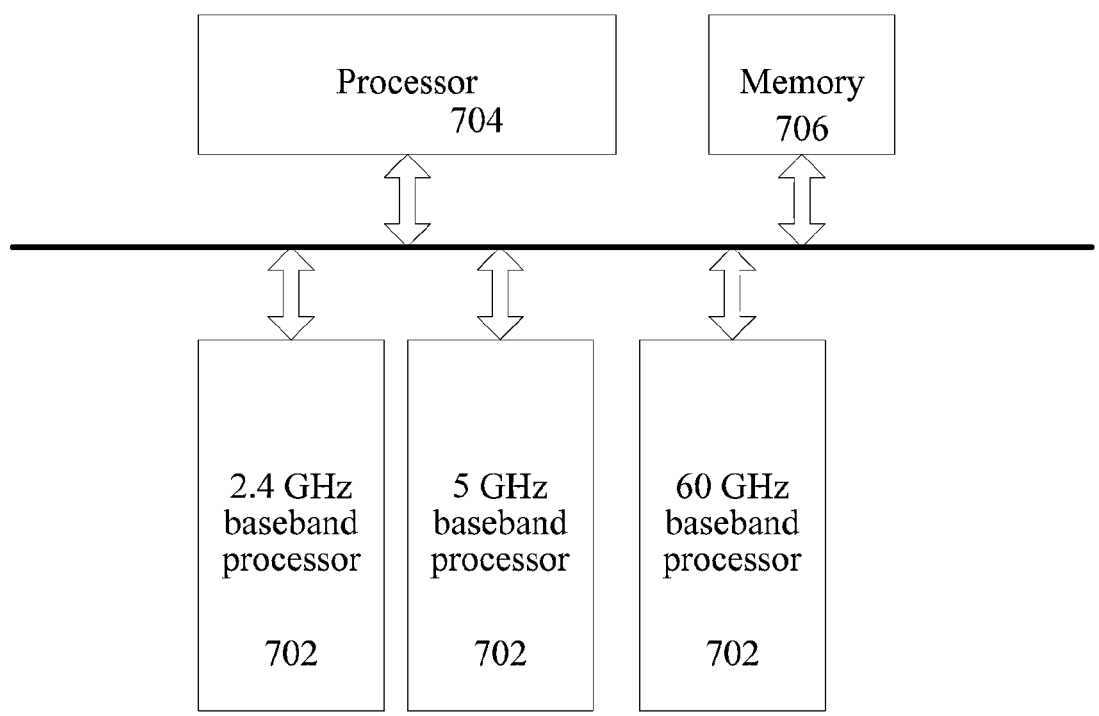
FIG. 7 is a schematic structural diagram of a wireless access point according to an embodiment of the present invention.

Referring to FIG. 1 and FIG. 7, an embodiment of the present invention provides a wireless access point. FIG. 7 is a schematic structural diagram of a wireless access point according to an embodiment of the present invention. The wireless access point includes a baseband processor 702, a processor 704 and a memory 706. The baseband processor 702 is connected to the processor 704, and the memory 706 is connected to the processor 704. The baseband processor 702 is a baseband processor configured to process a WLAN signal. The baseband processor 702 obtains a radio signal, converts the radio signal into a packet format that can be processed by the processor 704, and converts a packet provided by the processor 704 into a radio signal. Specifically, the baseband processor 702 first demodulates the radio signal, that is, converts an analog radio signal into a digital signal, and then packages the digital signal into a packet according to a preset protocol; and the baseband processor 702 converts the packet provided by the processor 704 into a digital signal according to a preset protocol, and modulates the digital signal into a radio signal. Corresponding to different WLAN bands, the wireless AP may include one or more baseband processors 702, and each baseband processor 702 is connected to the processor 704. For example, the wireless AP only performs communication by using a 2.4 GHz band, and accordingly, the wireless AP only includes a baseband processor 702 for processing a 2.4 GHz radio signal. For another example, the wireless AP may perform communication by using a 2.4 GHz band, a 5 GHz band and a 60 GHz band, and accordingly, the wireless AP includes a baseband processor 702 for processing a 2.4 GHz radio signal, a baseband processor 702 for processing a 5 GHz radio signal, and a baseband processor 702 for processing a 60 GHz radio signal. The processor 704 may be a CPU. The memory 706 may be a volatile memory or a non-volatile memory. Optionally, the wireless AP may further provide an Ethernet interface. Optionally, the wireless AP may further provide a wide area network (WAN) interface. A bold line in FIG. 7 represents a bus.

The processor 704 executes the following steps according to program instructions stored in the memory 706.

First, the processor 704 receives, through the baseband processor 702, correspondence which is between a virtual interface MAC address of a first wireless station bridge and a MAC address of an Ethernet device connected to the first wireless station bridge and is from the first wireless station bridge.

The first wireless station bridge in the embodiment of the present invention may be any wireless station bridge, and for ease of description, the first wireless station bridge in the following description is 104 in FIG. 1.

One wireless station bridge generates a plurality of virtual interface MAC addresses. Any one of a plurality of virtual interface MAC addresses generated by one wireless station bridge is different from a MAC address of the wireless station bridge itself. Any one of a plurality of virtual interface MAC addresses generated by one wireless station bridge is different from a MAC address of an Ethernet device connected to the wireless station bridge.

After receiving an Ethernet data frame, the first wireless station bridge generates correspondence between a source MAC address of the Ethernet data frame and one virtual interface MAC address. The virtual interface MAC address is one of a plurality of virtual interface MAC addresses generated by the first wireless station bridge.

For example, the first wireless station bridge may generate the correspondence in the following several manners.

The first wireless station bridge may generate a plurality of virtual interface MAC addresses immediately when it becomes associated with a wireless AP. After receiving the Ethernet data frame, the first wireless station bridge selects one unused virtual interface MAC address from the plurality of virtual interface MAC addresses having already been generated, and generates correspondence between the source MAC address of the Ethernet data frame and the unused virtual interface MAC address. The selected virtual interface MAC address becomes a used virtual interface MAC address.

Alternatively, the first wireless station bridge may also generate one virtual interface MAC address corresponding to the source MAC address of the Ethernet data frame after receiving the Ethernet data frame. The generated virtual interface MAC address is different from the virtual interface MAC addresses having already been generated by the first wireless station bridge. The first wireless station bridge generates correspondence between the source MAC address of the Ethernet data frame and the generated virtual interface MAC address.

Alternatively, the first wireless station bridge may also generate a plurality of virtual interface MAC addresses immediately when it becomes associated with a wireless AP. After receiving the Ethernet data frame, the first wireless station bridge newly generates a virtual interface MAC address corresponding to the source MAC address of the Ethernet data frame if all the plurality of virtual interface MAC addresses having already been generated has been used. The newly generated virtual interface MAC address is different from the virtual interface MAC addresses having already been generated by the first wireless station bridge. The first wireless station bridge generates correspondence between the source MAC address of the Ethernet data frame and the newly generated virtual interface MAC address.

The first wireless station bridge may also generate virtual interface MAC addresses in other manners, and no matter which manner is used, there is one-to-one correspondence between the plurality of used virtual interface MAC addresses of the first wireless station bridge and MAC addresses of a plurality of Ethernet devices having communicated with the first wireless station bridge. That is to say, all source MAC addresses in correspondences, which are between source MAC addresses of all Ethernet data frames and virtual interface MAC addresses and has already been generated by the first wireless station bridge, are bijective mapped to all the virtual interface MAC addresses in the correspondences.

One wireless station bridge may generate a virtual interface MAC address at random, or may generate a virtual interface MAC address according to a preset rule. For example, the wireless station bridge may set 24 MSBs of the generated virtual interface MAC address to a fixed value, for example, an OUI; the 24 MSBs are followed by an AID of the wireless station bridge on an AP, and because 2 MSBs of the AID are a fixed value, the wireless station bridge may only set 14 LSBs of the AID here. 10 LSBs of the virtual interface MAC address are reserved bits, padding or random numbers. Optionally, if after receiving an Ethernet data frame, the wireless station bridge newly generates a virtual interface MAC address corresponding to a source MAC address of the Ethernet data frame, the wireless station bridge may calculate, according to the source MAC address and by using a preset algorithm, the virtual interface MAC address to be generated.

After generating the correspondence, the first wireless station bridge sends the correspondence to the wireless AP associated with the first wireless station bridge. After receiving the correspondence through the baseband processor 702, the processor 704 of the wireless AP broadcasts the correspondence through the baseband processor 702.

The processor 704 may further receive, through the baseband processor 702, correspondence which is between a virtual interface MAC address of a second wireless station bridge and a MAC address of an Ethernet device connected to the second wireless station bridge and is from the second wireless station bridge. After receiving the correspondence through the baseband processor 702, the processor 704 broadcasts the correspondence. The first wireless station bridge receives the correspondence.

Then, the processor 704 receives a first wireless local area network data frame from the second wireless station bridge through the baseband processor 702. A frame header of the first wireless local area network data frame includes a transmitter MAC address and a receiver MAC address.

The second wireless station bridge receives an Ethernet data frame sent by an Ethernet device, where a source MAC address of the Ethernet data frame is a MAC address of an Ethernet device connected to the second wireless station bridge. The second wireless station bridge generates a first WLAN data frame according to the Ethernet data frame. A transmitter MAC address in a frame header of the first WLAN data frame is a virtual interface MAC address corresponding to the source MAC address of the Ethernet data frame, and the virtual interface MAC address is one of a plurality of virtual interface MAC addresses of the second wireless station bridge. Alternatively, in a case that the first WLAN data frame carries an A-MSDU and a source address of an A-MSDU subframe in the A-MSDU is the virtual interface MAC address corresponding to the source MAC address of the Ethernet data frame, the transmitter MAC address in the frame header of the first WLAN data frame may be a MAC address of the second wireless station bridge.

A WLAN data frame is a frame for transmitting data in a WLAN. The WLAN data frame includes a frame header and an MSDU, or includes a frame header and an A-MSDU. One A-MSDU includes a plurality of A-MSDU subframes, and each A-MSDU subframe includes an A-MSDU subframe header and an MSDU. The A-MSDU subframe header includes a source address, a destination address, and a length of the MSDU in the A-MSDU subframe.

The frame header of the WLAN data frame is a MAC header. The number of MAC addresses in a frame header of a WLAN data frame transmitted between a wireless STA and a wireless AP is 3.

In a case that a destination device of the first wireless local area network data frame is a device connected to the wireless access point through the first wireless station bridge, the processor 704 generates a second wireless local area network data frame according to the first wireless local area network data frame. A frame header of the second wireless local area network data frame includes a transmitter MAC address and a receiver MAC address. The receiver MAC address in the frame header of the second wireless local area network data frame is a virtual interface MAC address corresponding to a MAC address of the destination device of the first wireless local area network data frame according to the correspondence between the virtual interface MAC address of the first wireless station bridge and the MAC address of the Ethernet device connected to the first wireless station bridge.

The transmitter MAC address in the frame header of the second WLAN data frame is the MAC address of the wireless AP.

(1) If the first WLAN data frame carries an MSDU, the frame header of the first WLAN data frame includes a destination MAC address. The destination MAC address is the MAC address of the destination device. The destination device of the first WLAN data frame is a device connected to the wireless access point through the first wireless station bridge, that is, the destination MAC address in the frame header of the first WLAN data frame is a MAC address of a device connected to the wireless access point through the first wireless station bridge.

If the second WLAN data frame carries an MSDU, the MSDU is the MSDU carried by the WLAN data frame sent by the second wireless station bridge, and the MAC addresses in the frame header of the second WLAN data frame further include a source MAC address. The source MAC address is the transmitter MAC address in the frame header of the first WLAN data frame.

If the second WLAN data frame carries an A-MSDU, an MSDU in one A-MSDU subframe in the A-MSDU is the MSDU carried by the first WLAN data frame, the destination address of the A-MSDU subframe is the destination MAC address in the frame header of the first WLAN data frame, and the source address of the A-MSDU subframe is the transmitter MAC address in the frame header of the first WLAN data frame. The MAC addresses in the frame header of the second WLAN data frame further include the BSSID. In this case, alternatively, the receiver MAC address in the frame header of the second wireless local area network data frame may be the MAC address of the second wireless station bridge.

If a destination device of a WLAN data frame which is received by the processor 704 through the baseband processor 702 and is from the second wireless station bridge, for example, a third WLAN data frame, is a device connected to the wireless AP through an Ethernet, for example, the device 118 in FIG. 1, the processor 704 generates the first Ethernet data frame according to the third WLAN data frame. If the third WLAN data frame carries an MSDU, a frame header of the third WLAN data frame includes a destination MAC address, a transmitter MAC address and a receiver MAC address. The destination device of the third WLAN data frame is a device connected to the wireless AP through an Ethernet, that is, the destination MAC address in the frame header of the third WLAN data frame is a MAC address of a device connected to the wireless AP through an Ethernet. The destination MAC address of the first Ethernet data frame is the destination MAC address in the frame header of the third WLAN data frame. The source MAC address of the first Ethernet data frame is a MAC address corresponding to the transmitter MAC address in the frame header of the third WLAN data frame according to the correspondence between the virtual interface MAC address of the second wireless station bridge and the MAC address of the Ethernet device connected to the second wireless station bridge. Because the transmitter MAC address in the frame header of the third WLAN data frame is a virtual interface MAC address corresponding to a MAC address of an Ethernet device that sends an Ethernet data frame to the second wireless station bridge, the source MAC address of the first Ethernet data frame is the MAC address of the Ethernet device that sends the Ethernet data frame to the second wireless station bridge. If the third WLAN data frame carries an A-MSDU, the frame header of the third WLAN data frame includes the BSSID, a transmitter MAC address and a receiver MAC address. The destination device of the third WLAN data frame is a device connected to the wireless AP through an Ethernet, that is, a destination address of any one of a plurality of A-MSDU subframes in the A-MSDU carried by the third WLAN data frame is a MAC address of a device connected to the wireless AP through an Ethernet. Specifically, the processor 704 generates the first Ethernet data frame according to an A-MSDU subframe whose destination address is a MAC address of a device connected to the wireless AP through an Ethernet and which is in the third WLAN data frame. The destination MAC address of the first Ethernet data frame is the destination address of the A-MSDU subframe. The source MAC address of the first Ethernet data frame is the source address of the A-MSDU subframe.

If the destination MAC address in the frame header of the first WLAN data frame is a broadcast MAC address or a multicast MAC address, the processor 704 sends a fifth WLAN data frame after receiving the first WLAN data frame through the baseband processor 702. A receiver MAC address in a frame header of the fifth WLAN data frame is the destination MAC address in the frame header of the first WLAN data frame, that is, the broadcast MAC address or the multicast MAC address. A transmitter MAC address in the frame header of the fifth WLAN data frame is the MAC address of the wireless AP. If the fifth WLAN data frame carries an MSDU, the MSDU is the MSDU carried by the first WLAN data frame, and the MAC addresses in the frame header of the fifth WLAN data frame further include a source MAC address. The source MAC address is the transmitter MAC address in the frame header of the first WLAN data frame. If the fifth WLAN data frame carries an A-MSDU, an MSDU in one A-MSDU subframe in the A-MSDU is the MSDU carried by the first WLAN data frame, the destination address of the A-MSDU subframe is the destination MAC address in the frame header of the first WLAN data frame, that is, the broadcast MAC address or the multicast MAC address, and the source address of the A-MSDU subframe is the transmitter MAC address in the frame header of the first WLAN data frame. The MAC addresses in the frame header of the fifth WLAN data frame further include the BSSID.

(2) If the first WLAN data frame carries an A-MSDU, the A-MSDU carried by the first WLAN data frame includes a plurality of A-MSDU subframes. Destination addresses of the plurality of A-MSDU subframes are the MAC addresses of the destination devices. The destination device of the first WLAN data frame is a device connected to the wireless access point through the first wireless station bridge, that is, a destination address of any one of the plurality of A-MSDU subframes in the A-MSDU carried by the first WLAN data frame is a MAC address of a device connected to the wireless access point through the first wireless station bridge.

The transmitter MAC address in the frame header of the second WLAN data frame is the MAC address of the wireless AP.

If the second WLAN data frame carries an MSDU, the MSDU is an MSDU of an A-MSDU subframe whose destination address is a MAC address of an Ethernet device connected to the first wireless station bridge and which is in the A-MSDU carried by the first WLAN data frame. The receiver MAC address in the frame header of the second WLAN data frame is a virtual interface MAC address corresponding to the destination address of the A-MSDU subframe whose destination address is a MAC address of an Ethernet device connected to the first wireless station bridge and which is in the A-MSDU carried by the first WLAN data frame, according to the correspondence which is between the virtual interface MAC address of the first wireless station bridge and the MAC address of the Ethernet device connected to the first wireless station bridge and is sent by the first wireless station bridge. The MAC addresses in the frame header of the second WLAN data frame further include a source MAC address. The source MAC address in the frame header of the second WLAN data frame is a virtual interface MAC address corresponding to the source address of the A-MSDU subframe whose destination address is a MAC address of an Ethernet device connected to the first wireless station bridge and which is in the A-MSDU carried by the first WLAN data frame, according to the correspondence which is between the MAC address of the Ethernet device connected to the second wireless station bridge and the virtual interface MAC address and is sent by the second wireless station bridge. Alternatively, if the transmitter MAC address in the frame header of the first WLAN data frame is a virtual interface MAC address corresponding to the source MAC address of the Ethernet data frame received by the second wireless station bridge, the source MAC address in the frame header of the second WLAN data frame may be the transmitter MAC address in the frame header of the first WLAN data frame.

If the second WLAN data frame carries an A-MSDU, one A-MSDU subframe in the A-MSDU is the A-MSDU subframe whose destination address is a MAC address of an Ethernet device connected to the first wireless station bridge and which is in the A-MSDU carried by the first WLAN data frame. The receiver MAC address in the frame header of the second WLAN data frame is the MAC address of the first wireless station bridge. Alternatively, the receiver MAC address in the frame header of the second WLAN data frame is the virtual interface MAC address corresponding to the destination address of the A-MSDU subframe whose destination address is a MAC address of an Ethernet device connected to the first wireless station bridge and which is in the A-MSDU carried by the first WLAN data frame, according to the correspondence which is between the virtual interface MAC address of the first wireless station bridge and the MAC address of the Ethernet device connected to the first wireless station bridge and is sent by the first wireless station bridge. The MAC addresses in the frame header of the second WLAN data frame further include the BSSID.

If a destination address of one A-MSDU subframe in the A-MSDU carried by the first WLAN data frame is a broadcast MAC address or a multicast MAC address, the processor 704 sends a fifth WLAN data frame after receiving the first WLAN data frame through the baseband processor 702. A receiver MAC address in a frame header of the fifth WLAN data frame is the destination address of the A-MSDU subframe, that is, the broadcast MAC address or the multicast MAC address. The transmitter MAC address in the frame header of the fifth WLAN data frame is the MAC address of the wireless AP. If the fifth WLAN data frame carries an MSDU, the MSDU is an MSDU of the A-MSDU subframe in the A-MSDU carried by the first WLAN data frame. The MAC addresses in the frame header of the fifth WLAN data frame further include a source MAC address. The source MAC address in the frame header of the fifth WLAN data frame is the source MAC address of the A-MSDU subframe in the A-MSDU carried by the first WLAN data frame. If the fifth WLAN data frame carries an A-MSDU, one A-MSDU subframe in the A-MSDU is the A-MSDU subframe in the A-MSDU carried by the first WLAN data frame. If the fifth WLAN data frame carries an A-MSDU, the MAC addresses in the frame header of the fifth WLAN data frame further include the BSSID. The processor 704 further broadcasts or multicasts an Ethernet data frame through an Ethernet interface. The destination MAC address of the Ethernet data frame is the destination address of the A-MSDU subframe, that is, the broadcast MAC address or the multicast MAC address. The source MAC address of the Ethernet data frame is a MAC address corresponding to the source MAC address of the A-MSDU subframe according to the correspondence between the virtual interface MAC address of the second wireless station bridge and the MAC address of the Ethernet device connected to the second wireless station bridge. Because the source address of the A-MSDU subframe is a virtual interface MAC address corresponding to a MAC address of an Ethernet device connected to the second wireless station bridge, the source MAC address of the Ethernet data frame is a MAC address of an Ethernet device connected to the second wireless station bridge.

The first wireless station bridge receives the fifth WLAN data frame, and if the fifth WLAN data frame carries an A-MSDU, the first wireless station bridge generates an Ethernet data frame according to an A-MSDU subframe in the A-MSDU carried by the fifth WLAN data frame. A destination MAC address of the Ethernet data frame is the destination address of the A-MSDU subframe. A source MAC address of the Ethernet data frame is a MAC address corresponding to the source MAC address of the A-MSDU subframe according to the correspondence which is between the virtual interface MAC address of the second wireless station bridge and the MAC address of the Ethernet device connected to the second wireless station bridge and is broadcast by the processor 704 through the baseband processor 702. Because the source address of the A-MSDU subframe is a virtual interface MAC address corresponding to a MAC address of an Ethernet device connected to the second wireless station bridge, the source MAC address of the Ethernet data frame is a MAC address of an Ethernet device connected to the second wireless station bridge.

Because the receiver MAC address in the frame header of the fifth WLAN data frame is the broadcast MAC address or the multicast MAC address, the second wireless station bridge also receives the fifth WLAN data frame. If the fifth WLAN data frame carries an MSDU, the second wireless station bridge checks the source MAC address in the frame header of the fifth WLAN data frame. If the source MAC address in the frame header of the fifth WLAN data frame is a virtual interface MAC address of the second wireless station bridge, that is, the source MAC address is one of a plurality of virtual interface MAC addresses of the second wireless station bridge, the second wireless station bridge discards the fifth WLAN data frame. If the fifth WLAN data frame carries an A-MSDU, the second wireless station bridge obtains each A-MSDU subframe in the A-MSDU carried by the fifth WLAN data frame. The second wireless station bridge checks the source address of the obtained A-MSDU subframe, and if the source address of the A-MSDU subframe is a virtual interface MAC address of the second wireless station bridge, that is, the source address is one of a plurality of virtual interface MAC addresses of the second wireless station bridge, the second wireless station bridge discards the A-MSDU subframe.

If the processor 704 receives a second Ethernet data frame from a second Ethernet device through the baseband processor 702, and a destination MAC address of the second Ethernet data frame is a MAC address of a device connected to the wireless AP through the first wireless station bridge, the processor 704 generates a fourth WLAN data frame according to the second Ethernet data frame. The second Ethernet device is a device connected to the wireless AP through an Ethernet, for example, the device 118 in FIG. 1. A frame header of the fourth WLAN data frame includes a source MAC address, a transmitter MAC address and a receiver MAC address. The source MAC address in the frame header of the fourth WLAN data frame is the source MAC address of the second Ethernet data frame. The receiver MAC address in the frame header of the fourth WLAN data frame is a virtual interface MAC address which is of the first wireless station bridge and corresponds to the destination MAC address of the second Ethernet data frame according to the correspondence between the virtual interface MAC address of the first wireless station bridge and the MAC address of the Ethernet device connected to the first wireless station bridge. The transmitter MAC address in the frame header of the fourth WLAN data frame is the MAC address of the wireless AP, that is, the BSSID. The processor 704 sends the fourth wireless local area network data frame through the baseband processor 702.

Finally, the processor 704 sends the second wireless local area network data frame through the baseband processor 702.

The first wireless station bridge receives the second WLAN data frame sent through the baseband processor 702 by the processor 704. If the second WLAN data frame carries an MSDU, the first wireless station generates a third Ethernet data frame according to the second WLAN data frame. A destination MAC address of the third Ethernet data frame is a MAC address corresponding to the receiver MAC address in the frame header of the second WLAN data frame according to the correspondence between the virtual interface MAC address of the first wireless station bridge and the MAC address of the Ethernet device connected to the first wireless station bridge. Because the receiver MAC address in the frame header of the second WLAN data frame is the virtual interface MAC address corresponding to the MAC address of the Ethernet device connected to the first wireless station bridge, the destination MAC address in the frame header of the second WLAN data frame is the MAC address of the Ethernet device connected to the first wireless station bridge. The source MAC address of the third Ethernet data frame is a MAC address corresponding to the source MAC address in the frame header of the second WLAN data frame according to the correspondence between the virtual interface MAC address of the second wireless station bridge and the MAC address of the Ethernet device connected to the second wireless station bridge. Because the source MAC address in the frame header of the second WLAN data frame is the transmitter MAC address in the frame header of the WLAN data frame sent by the second wireless station bridge, that is, a virtual interface MAC address corresponding to a MAC address of an Ethernet device that sends an Ethernet data frame to the second wireless station bridge, the source MAC address of the third Ethernet data frame is the MAC address of the Ethernet device that sends the Ethernet data frame to the second wireless station bridge. If the second WLAN data frame carries an A-MSDU, the first wireless station generates a third Ethernet data frame according to an A-MSDU subframe in the A-MSDU carried by the second WLAN data frame. The destination MAC address and the source MAC address of the third Ethernet data frame are respectively the destination address and the source address of the A-MSDU subframe.

A person of ordinary skill in the art may understand that all or a part of steps of various methods embodiments may be implemented by a program instructing relevant hardware. The corresponding program may be stored in a computer readable storage medium, and the storage medium may be a random-access memory, a read-only memory, a flash memory, a hard disk drive, a solid-state drive or an optical disk, and so on.

The foregoing descriptions are merely exemplary specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless station, comprising an Ethernet adapter, a wireless local area network adapter, a processor and a memory, wherein each of the Ethernet adapter, the wireless local area network adapter, and the memory is connected to the processor;

the Ethernet adapter receives a first Ethernet data frame sent by a first Ethernet device, wherein a source media access control (MAC) address of the first Ethernet data frame is a MAC address of the first Ethernet device connected to the wireless station;

the processor generates a first wireless local area network data frame according to the first Ethernet data frame, wherein the first wireless local area network data frame comprises: a first transmitter MAC address that is a virtual interface MAC address associated with the source MAC address of the first Ethernet data frame, and the virtual interface MAC address is one of a plurality of virtual interface MAC addresses of the wireless station; and wherein after receiving the first Ethernet data frame, the processor generates a first correspondence between the source MAC address of the first Ethernet data frame and the virtual interface MAC address of the wireless station corresponding to the source MAC address of the first Ethernet data frame; and the wireless local area network adapter sends, to a wireless access point, the correspondence between the source MAC address of the first Ethernet data frame and the virtual interface MAC address of the wireless station.

2. The wireless station according to claim 1, wherein:

the wireless local area network adapter receives a second correspondence which is between a virtual interface MAC address of a wireless station bridge and a MAC address of an Ethernet device connected to the wireless station bridge and is sent by the wireless access point;

the wireless local area network adapter receives a second wireless local area network data frame sent by the wireless access point, wherein a frame header of the second wireless local area network data frame comprises a source MAC address, a second transmitter MAC address and a second receiver MAC address, the second receiver MAC address is the virtual interface MAC address of the wireless station, and the source MAC address in the frame header of the second wireless local area network data frame is the virtual interface MAC address of the second wireless station bridge; and the processor generates a second Ethernet data frame according to the second wireless local area network data frame, wherein a destination MAC address of the second Ethernet data frame is a MAC address which is of an Ethernet device connected to the wireless station and corresponds to the second receiver MAC address in the frame header of the second wireless local area network data frame, according to the first correspondence between the source MAC address of the first Ethernet data frame and the virtual interface MAC address corresponding to the source MAC address, and a source MAC address of the second Ethernet data frame is a MAC address which is of an Ethernet device connected to the second wireless station bridge and corresponds to the source MAC address in the frame header of the second wireless local area network data frame, according to the second correspondence between the virtual interface MAC address of the second wireless station bridge and the MAC address of the Ethernet device connected to the second wireless station bridge.

3. The wireless station according to claim 1, wherein:

the wireless local area network adapter receives a third wireless local area network data frame sent by the wireless access point, wherein a frame header of the third wireless local area network data frame comprises a source MAC address, a third transmitter MAC address and a third receiver MAC address; and when the third receiver MAC address in the frame header of the third wireless local area network data frame is a broadcast MAC address or a multicast MAC address, and the source MAC address in the frame header of the third wireless local area network data frame is the virtual interface MAC address of the wireless station, the processor discards the third wireless local area network data frame.

4. The wireless station according to claim 1, wherein when a destination MAC address of the first Ethernet data frame is a broadcast MAC address or a multicast MAC address and the first wireless local area network data frame carries an aggregate MAC service data unit (A-MSDU), the A-MSDU comprises an A-MSDU subframe; and the A-MSDU subframe is generated by the processor according to the first Ethernet data frame, a source address of the A-MSDU subframe is the virtual interface MAC address corresponding to the source MAC address of the first Ethernet data frame, and a destination address of the A-MSDU subframe is the destination MAC address of the first Ethernet data frame.

5. The wireless station according to claim 1, wherein:

the wireless local area network adapter receives a third wireless local area network data frame sent by the wireless access point, wherein the third wireless local area network data frame carries an aggregate MAC service data unit (A-MSDU), and a third receiver MAC address in a frame header of the third wireless local area network data frame is a broadcast MAC address or a multicast MAC address;

the processor obtains an A-MSDU subframe in the A-MSDU carried by the third wireless local area network data frame; and when a source address of the A-MSDU subframe is the virtual interface MAC address of the wireless station, the processor discards the A-MSDU subframe.

6. The wireless station according to claim 1, wherein:

the wireless local area network adapter receives a second correspondence which is between a virtual interface MAC address of a wireless station bridge and a MAC address of an Ethernet device connected to the wireless station bridge and is sent by the wireless access point;

the wireless local area network adapter receives a second wireless local area network data frame sent by the wireless access point, comprising the virtual interface MAC address of the wireless station and the virtual interface MAC address of the wireless station bridge; and the processor generates a second Ethernet data frame according to the second wireless local area network data frame.

7. The wireless station according to claim 6, wherein:

a destination MAC address of the second Ethernet data frame is a MAC address which is of an Ethernet device connected to the wireless station and corresponds to a second receiver MAC address in a frame header of the second wireless local area network data frame, according to the first correspondence between the source MAC address of the first Ethernet data frame and the virtual interface MAC address corresponding to the source MAC address, and a source MAC address of the second Ethernet data frame is a MAC address which is of an Ethernet device connected to the wireless station bridge and corresponds to a source MAC address in the frame header of the second wireless local area network data frame, according to the second correspondence between the virtual interface MAC address of the wireless station bridge and the MAC address of the Ethernet device connected to the wireless station bridge.

8. A wireless access point, comprising a baseband processor, a processor and a memory, wherein each of the baseband processor and the memory is connected to the processor;

the processor receives, through the baseband processor, a first correspondence which is between a virtual interface media access control (MAC) address of a first wireless station bridge and a MAC address of an Ethernet device connected to the first wireless station bridge and is from the first wireless station bridge;

the processor receives a first wireless local area network data frame from a second wireless station bridge through the baseband processor, wherein the first wireless local area network data frame includes a first transmitter MAC address, a first receiver MAC address and a destination MAC address;

when a destination device of the first wireless local area network data frame is a device connected to the wireless access point through the first wireless station bridge, the processor generates a second wireless local area network data frame according to the first wireless local area network data frame, wherein the second wireless local area network data frame comprises a second receiver MAC address that is a virtual interface MAC address associated with a MAC address of the destination device of the first wireless local area network data frame, based on the first correspondence between the virtual interface MAC address of the first wireless station bridge and the MAC address of the Ethernet device connected to the first wireless station bridge; and wherein the MAC address of the destination device of the first wireless local area network data frame is the destination MAC address in the first wireless local area network data frame;

the processor sends the second wireless local area network data frame through the baseband processor;

wherein the second wireless local area network data frame further comprises a source MAC address which is the first transmitter MAC address of the first wireless local area network data frame.

9. The wireless access point according to claim 8, wherein the first wireless local area network data frame carries an aggregate MAC service data unit (A-MSDU);

wherein the first wireless local area network data frame further comprises a basic service set identification (BSSID);

the MAC address of the destination device of the first wireless local area network data frame is a destination MAC address of an A-MSDU subframe of the A-MSDU carried by the first wireless local area network data frame;

wherein the second wireless local area network data frame further comprises a source MAC address which is the first transmitter MAC address in the first wireless local area network data frame; and wherein the second wireless local area network data frame comprises a virtual interface MAC address corresponding to a destination address of the A-MSDU subframe according to the first correspondence between the virtual interface MAC address of the first wireless station bridge and the MAC address of the Ethernet device connected to the first wireless station bridge.

10. The wireless access point according to claim 8, wherein the first wireless local area network data frame carries an aggregate MAC service data unit (A-MSDU);

wherein the first wireless local area network data frame further comprises a basic service set identification (BSSID);

the MAC address of the destination device of the first wireless local area network data frame is a destination MAC address of an A-MSDU subframe of the A-MSDU carried by the first wireless local area network data frame;

wherein the second wireless local area network data frame further comprises the BSSID and the A-MSDU.

11. The wireless access point according to claim 8, wherein:

the processor receives a third wireless local area network data frame from the second wireless station bridge through the baseband processor, wherein the third wireless local area network data frame carries a MAC service data unit (MSDU), and a frame header of the third wireless local area network data frame comprises a destination MAC address, a third transmitter MAC address and a third receiver MAC address;

when the destination MAC address in the frame header of the third wireless local area network data frame is a MAC address of a device connected to the wireless access point through an Ethernet, the processor generates a first Ethernet data frame according to the third wireless local area network data frame.

12. The wireless access point according to claim 11, wherein:

a source MAC address of the first Ethernet data frame is a MAC address corresponding to the transmitter MAC address in the frame header of the third wireless local area network data frame according to a second correspondence between a virtual interface MAC address of the second wireless station bridge and a MAC address of an Ethernet device connected to the second wireless station bridge, and a destination MAC address of the first Ethernet data frame is the destination MAC address in the frame header of the third wireless local area network data frame; and the processor sends the first Ethernet data frame through the baseband processor.

13. The wireless access point according to claim 8, wherein:

the processor receives a second Ethernet data frame from a second Ethernet device through the baseband processor;

when a destination MAC address of the second Ethernet data frame is a MAC address of a device connected to the wireless access point through the first wireless station bridge, the processor generates a fourth wireless local area network data frame according to the second Ethernet data frame, wherein a frame header of the fourth wireless local area network data frame comprises a source MAC address, a fourth transmitter MAC address and a fourth receiver MAC address, the source MAC address in the frame header of the fourth wireless local area network data frame is a source MAC address of the second Ethernet data frame, and the receiver MAC address in the frame header of the fourth wireless local area network data frame is a virtual interface MAC address corresponding to the destination MAC address of the second Ethernet data frame according to the first correspondence between the virtual interface MAC address of the first wireless station bridge and the MAC address of the Ethernet device connected to the first wireless station bridge; and the processor sends the fourth wireless local area network data frame through the baseband processor.

14. A wireless station, comprising an Ethernet adapter, a wireless local area network adapter, a processor and a memory, wherein each of the Ethernet adapter, the wireless local area network adapter, and the memory is connected to the processor;

the Ethernet adapter receives a first Ethernet data frame sent by a first Ethernet device, wherein a source media access control (MAC) address of the first Ethernet data frame is a MAC address of a first Ethernet device connected to the wireless station;

the processor generates a first wireless local area network data frame according to the first Ethernet data frame, wherein a frame header of the first wireless local area network data frame comprises a transmitter MAC address, a receiver MAC address and a basic service set identification (BSSID), the transmitter MAC address in the frame header of the first wireless local area network data frame is the source MAC address of the first Ethernet data frame, and the receiver MAC address in the frame header of the first wireless local area network data frame is a MAC address of a wireless access point, and the first wireless local area network data frame carries an aggregate MAC service data unit (A-MSDU), the A-MSDU comprises an A-MSDU subframe, the A-MSDU subframe is generated according to the first Ethernet data frame, a source address of the A-MSDU subframe is a virtual interface MAC address associated with the source MAC address of the first Ethernet data frame, the virtual interface MAC address is one of a plurality of virtual interface MAC addresses of the wireless station, and a destination address of the A-MSDU subframe is a destination MAC address of the first Ethernet data frame; and the wireless local area network adapter sends the first wireless local area network data frame.

15. The wireless station according to claim 14, wherein the destination MAC address of the first Ethernet data frame is a broadcast MAC address or a multicast MAC address.

16. The wireless station according to claim 14, wherein after receiving the first Ethernet data frame, the processor generates a first correspondence between the source MAC address of the first Ethernet data frame and the virtual interface MAC address corresponding to the source MAC address; and the wireless local area network adapter sends, to the wireless access point, the first correspondence between the source MAC address of the first Ethernet data frame and the virtual interface MAC address which is of the wireless station and corresponds to the source MAC address.

17. The wireless station according to claim 14, wherein:

the wireless local area network adapter receives a third wireless local area network data frame sent by the wireless access point, wherein the third wireless local area network data frame carries an A-MSDU;

the processor obtains an A-MSDU subframe in the A-MSDU carried by the third wireless local area network data frame;

the processor generates a second Ethernet data frame according to the A-MSDU subframe, wherein a destination MAC address of the second Ethernet data frame is a destination address of the A-MSDU subframe, and a source MAC address of the second Ethernet data frame is a MAC address corresponding to a source MAC address of the A-MSDU subframe according to a correspondence broadcast by the wireless access point; and the Ethernet adapter sends the second Ethernet data frame.

18. The wireless station according to claim 14, wherein:

the wireless local area network adapter receives a third wireless local area network data frame sent by the wireless access point, wherein the third wireless local area network data frame carries an A-MSDU, and a receiver MAC address in a frame header of the third wireless local area network data frame is a broadcast MAC address or a multicast MAC address;

the processor obtains an A-MSDU subframe in the A-MSDU carried by the third wireless local area network data frame; and when a source address of the A-MSDU subframe is the virtual interface MAC address of the wireless station, the processor discards the A-MSDU subframe.

\* \* \* \* \*

UNITED STATES PATENT AND TRADEMARK OFFICE
CERTIFICATE OF CORRECTION

PATENT NO.        : 9,325,523 B2                                              Page 1 of 1
APPLICATION NO.   : 14/306031
DATED             : April 26, 2016
INVENTOR(S)       : Wang et al.

It is certified that error appears in the above-identified patent and that said Letters Patent is hereby corrected as shown below:

Title page, Item 72 Inventors, "Donald Eggleston" should read
-- Donald Eggleston Eastlake, III --.

Signed and Sealed this
Fifth Day of July, 2016

Michelle K. Lee
*Director of the United States Patent and Trademark Office*